US005617518A

United States Patent [19]
Kuwamoto et al.

[11] Patent Number: 5,617,518
[45] Date of Patent: Apr. 1, 1997

[54] OUTPUT CONTROL METHOD AND SYSTEM OF SERVERS

[75] Inventors: Hideki Kuwamoto, Yokohama; Takao Iwatani, Fujisawa; Keiichi Nakane, Yokohama; Masaki Fujiwara, Hitachi, all of Japan

[73] Assignee: Hitachi, Ltd., Tokyo, Japan

[21] Appl. No.: 470,007

[22] Filed: Jun. 6, 1995

Related U.S. Application Data

[63] Continuation of Ser. No. 791,125, Nov. 13, 1991, abandoned.

[30] Foreign Application Priority Data

Nov. 13, 1990 [JP] Japan ................................. 2-306394
Apr. 2, 1991 [JP] Japan ................................. 3-069688

[51] Int. Cl.$^6$ .................................................. G06K 15/00
[52] U.S. Cl. ........................................... 395/114; 395/112
[58] Field of Search .............................. 395/112, 114, 395/115, 110, 828, 830, 200.02, 200.03, 200.1; 400/61, 62, 70, 71, 72, 76; 358/404

[56] References Cited

U.S. PATENT DOCUMENTS 4,651,278  3/1987  Herzog et al. ................... 395/114
5,050,098  9/1991  Brown, III et al. .............. 355/114
5,129,050  7/1992  Ikenoue et al. ................. 395/115
5,220,674  6/1993  Morgan et al. .................. 395/275

Primary Examiner—Arthur G. Evans
Attorney, Agent, or Firm—Antonelli, Terry, Stout & Kraus, LLP

[57] ABSTRACT

A system having at least one information processing apparatus such as a word processor and a printing apparatus as a print server for printing print data which is given from the information processing apparatus using print programs. When the print data which the information processing apparatus itself has is printed by the printing apparatus, the information processing apparatus transfers a print program suitable to print the print data to the printing apparatus, so that the printing apparatus prints the print data by using the print program transferred. In the case where a plurality of data are stored in a memory apparatus in the print server, the data is outputted to the printing apparatus in accordance with a predetermined order. However, when the print server receives an output request of the data from the information processing apparatus from the information processing apparatus, in the case where there is no data which is being outputted to the printing apparatus or whose output is waited, the output requested data is supplied to the printing apparatus without being stored into the memory device.

14 Claims, 25 Drawing Sheets

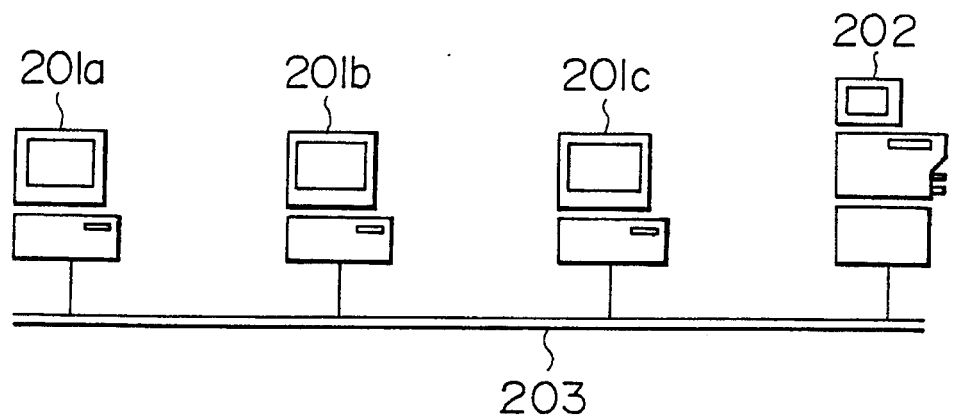
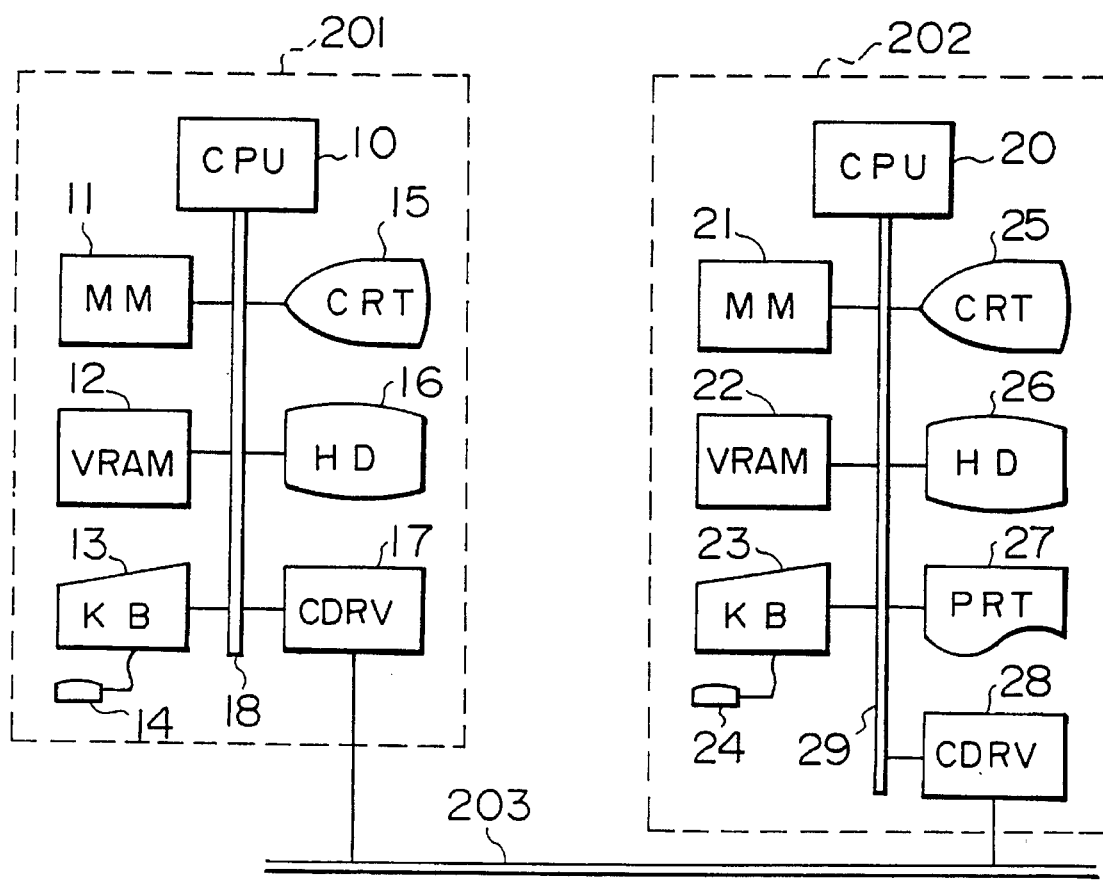

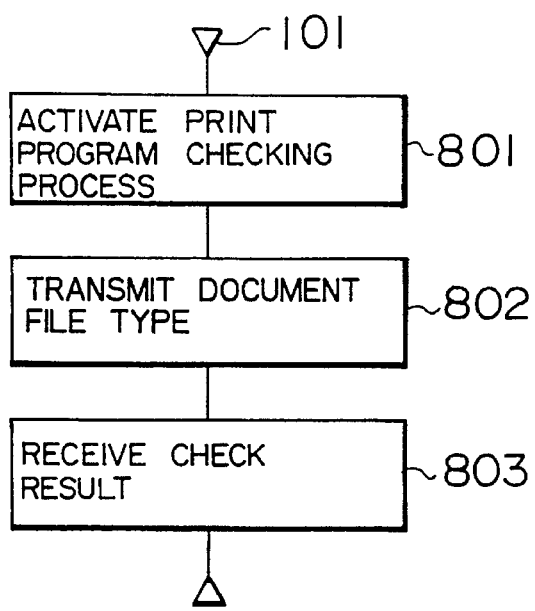
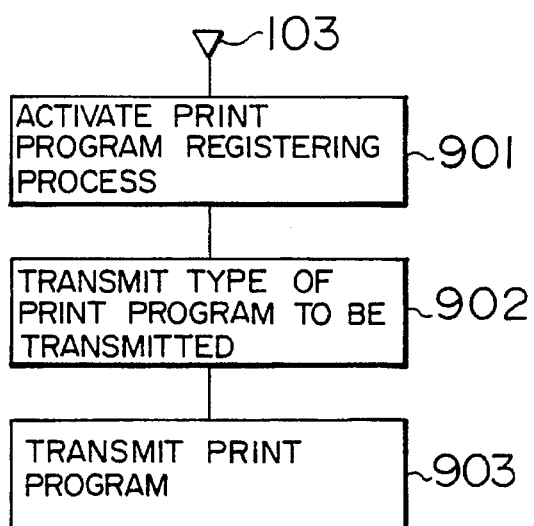
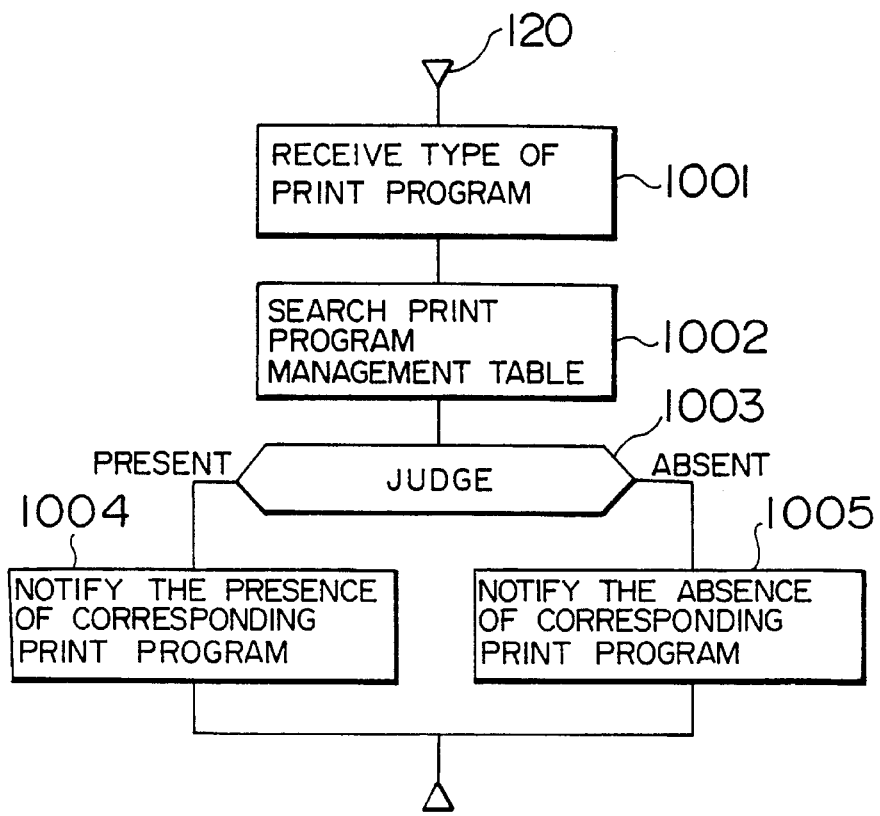

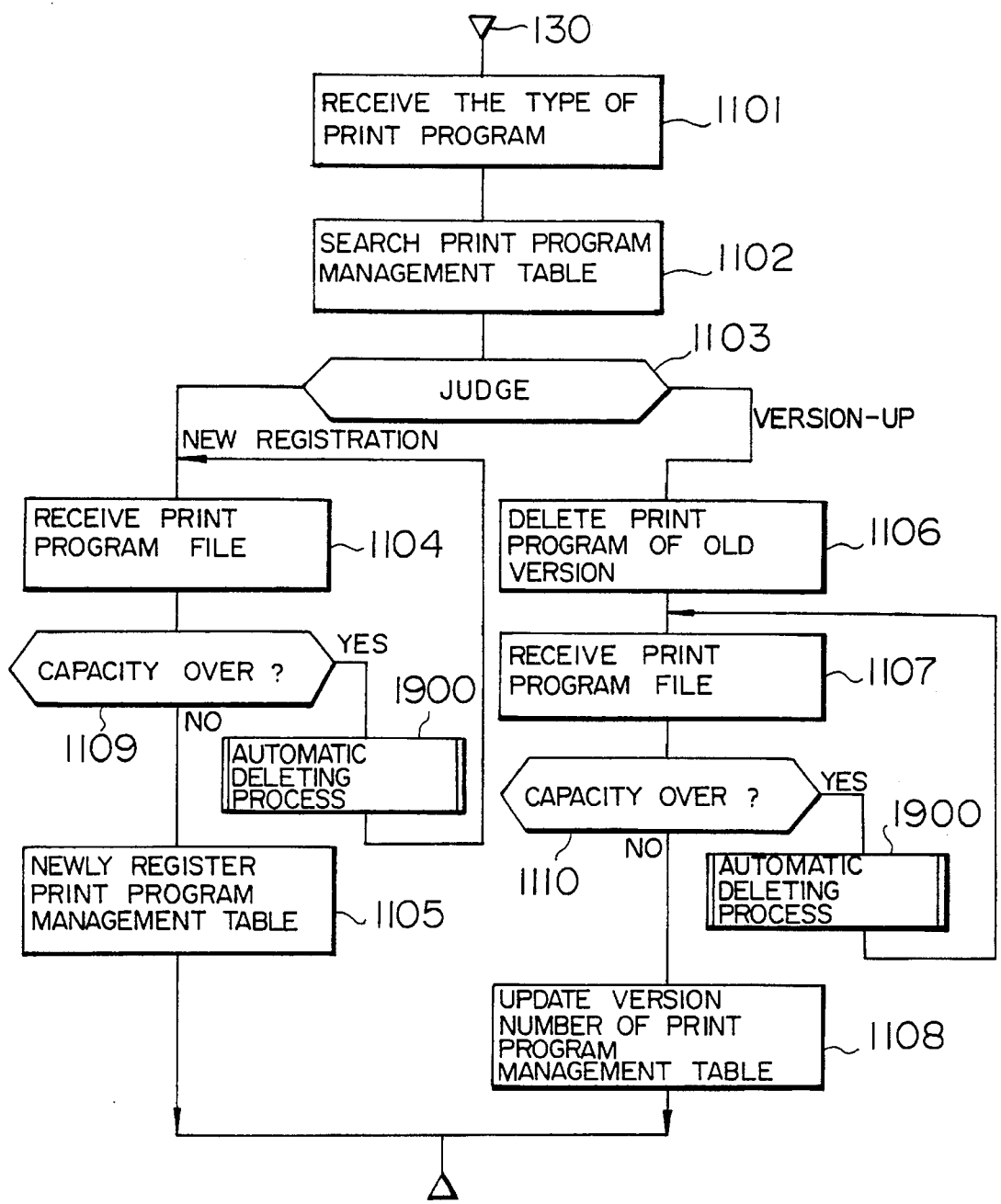

FIG. 31A

IN CASE OF DISPLAYING ERROR
TO CORRESPONDING USER                13100

```
ERROR HAS OCCURRED IN PRINTER DUE TO
PRINTING REQUESTED BY YOU

13110 — DOCUMENT NAME:  XXXX
13120 — USER ID:  XXXX
```

FIG. 31B

IN CASE OF DISPLAYING ERROR TO
CORRESPONDING WORD PROCESSOR    13200

```
ERROR HAS OCCURRED IN PRINTER DUE TO
PRINTING REQUESTED FROM THIS WORD
PROCESSOR

13210 — DOCUMENT NAME  XXXX
13220 — USER ID ON PRINT REQUESTING SIDE : XXXX
13230 — CLIENT ADDRESS : 0000
```

FIG. 31C

IN CASE OF DISPLAYING ERRORS
TO ALL WORD PROCESSORS             13300

```
ERROR HAS OCCURRED IN PRINTER

13310 — DOCUMENT NAME  XXXX
13320 — USER ID ON PRINT REQUESTING
                              SIDE: XXXX
13330 — CLIENT ADDRESS ON PRINT REQUESTING
                              SIDE: 0000
```

OUTPUT CONTROL METHOD AND SYSTEM OF SERVERS

This application is a continuation application of Ser. No. 07/791,125, filed Nov. 13, 1991, now abandoned.

BACKGROUND OF THE INVENTION

The invention relates to a system comprising a plurality of information processing apparatuses to produce data and a server for receiving the data from the information processing apparatuses and for outputting by using an output apparatus and, more particularly, to the method of controlling programs for printing and apparatus which are suitable in the case where, when a server is used as a printing apparatus, a plurality of information processing apparatuses in which commands to control the printing apparatus are different are connected to the server with the printing apparatus. The invention, further, relates to an output control system of a server which is suitable in the case where the server has a spooling function such that an output request of data exceeding an amount which can be processed by an output apparatus in a unit time is received from information processing apparatuses and the output data concerning the output request is sequentially generated according to a predetermined order.

In recent years, from viewpoints of the reduction of the system costs and the effective use of the office space, a system which consists of a print server which has a printer and a plurality of information processing apparatuses is widespreading. Hereinafter, the information processing apparatus is called a client and the server is called a print server as necessary. Generally, the clients and the print server are mutually connected by using a communication medium such as an LAN (Local Area Networks) or the like and the clients transfer the print data to the print server through the communication medium, thereby printing.

The following problems, however, occur by the recent situation such that various kinds of information processing apparatuses including general computers and small personal computers are mutually connected by a communication. That is, the formats of the print data produced by the information processing apparatuses are different depending on each information processing apparatus or application programs executed on each information processing apparatus, so that it is difficult for the print server to cope with the formats of such various kinds of print data. Therefore there are limitations in the kinds of documents which can be printed by the print server or in the printing function of the print server which can be used by the information processing apparatuses. For instance, only the characters can be printed or the like.

As an example of a conventional printing system in which a printing apparatus is commonly used by a plurality of information processing apparatuses while solving the above problems, there is a system shown in "LOCAL AREA NETWORK", issued by Maruzen Co., Ltd., pages 229 to 256. That is, the information processing apparatuses convert the document data into the print data of the common format which is independent of the kinds of information processing apparatuses or application programs and transfer the print data to the print server, thereby printing. Therefore, it is sufficient that the print server can accept only the print data of one kind.

As an example of the printing apparatus which can cope with the printing of the application programs of the various kinds of information processing apparatuses, there is also an apparatus disclosed in JP-A-2-5123. That is, when the various kinds of information processing apparatuses request the printing apparatus to print, before the document data to be printed is transferred to the printing apparatus, the print programs used by the application programs of the information processing apparatuses are transferred to the printing apparatus.

As another example of the conventional printing system, there is a system as shown in "JSTAR WORK STATION" issued by Maruzen Co., Ltd., pages 200 to 204 and 227 to 233. That is, after the clients which use the print server converted the document data into the print data, and then they transfer to the print server. The print server accepts the print data from the clients and stores such as print data as files. The files in which the print data have been stored are converted into the print commands in accordance with a predetermined order such as an accepting order from the clients or the like. The print commands are transmitted to the printer, thereby printing. With the above method, the print server can accept the print data exceeding the processing capability in an unit time of the printer from the clients. Such a mechanism is called a spooling function of the print server.

Reference may further be made to JP-A-61-125663 which discloses switching-over of programs (these programs are executed in a data processing apparatus) on the data processing apparatus side in order for the processing apparatus to carry out controlling in accordance with the type of an input/output apparatus to be used.

SUMMARY OF THE INVENTION

In the printing system of the conventional technique shown first, there are the following problems.

The information processing apparatuses must convert the document data into the print data of the common format which is independent of the kinds of the application programs and the information processing apparatuses. In order to cope with-various kinds of application programs and information processing apparatuses, such print data is the general data such that every kinds of characters, figures, images, and the like can be printed. The production of such print-data becomes a large processing burden to the information processing apparatuses. Consequently, it is difficult to realize the production of such general print data for an information processing apparatus of a small processing capability.

According to the foregoing method whereby the print programs corresponding to the application programs and the information processing apparatuses are transferred to the printing apparatus before printing, since the print programs and the document data are transferred to the printing apparatus upon printing, there is a problem such that the time which is required to transfer the print programs and the loads for the information processing apparatuses and the printing apparatus increase.

The printing system of the conventional technique shown at last has the following problems.

In the case where a plurality of clients commonly use one printer, it is an obvious matter that the print which is requested to the printer for a period of time when the printer is printing is waited. In the printing system of the foregoing conventional technique, however, the print data transferred from the clients are always once stored into the files and the printing is executed after that. Therefore, even in the case where the print data which is being printed or whose printing is waited doesn't exist, the print server must wait for a time to store the print data into the files. Further, there is also a case where it takes a long time to convert the document data into the print data on the client side, so that there is a case where the user must wait for a fairly long time until the first sheet of the result of the printing is obtained. As compared with the printing using the print server as mentioned above, in the case where the system doesn't have the spooling function and the document files are converted into the print commands and are printed by directly controlling the printer, a time which is required until the first sheet of the print result is obtained is short. Although the times which are required from the start of the printing of the first sheet until the end of the printing in both of the above cases are not so different, the length of time until the start of the printing of the first sheet in the case of the system having the spooling function is longer than that in the latter case. Such a length of time exerts a large influence on the patience of the user who is waiting for printed sheets.

In the conventional print server having the spooling function as mentioned above, even in the case where the print data which is being printed or whose printing is waited doesn't exist, there is a problem such that the waiting time until the start of the printing is long. Such a problem is not limited to the print server but is a common problem to various kinds of outputting apparatuses such as plotter, magnetic card writer, and the like.

It is an object of the invention to solve the conventional problems mentioned above and to provide print program control method and apparatus in which a printing apparatus can be commonly used by various kinds of information processing apparatuses while minimizing the processing burdens of the information processing apparatuses.

Another object of the invention is to solve the conventional problems mentioned above and to reduce the waiting time until the start of the output in an outputting apparatus having the spooling function in the case where data which is being generated or whose generation is waited doesn't exist.

To accomplish the first object, according to an aspect of the invention, in a system in which print data which is given from at least one information processing apparatus is printed by a printing apparatus controlled by a print program, when the self print data is printed by the printing apparatus, the information processing apparatus transfers the print program suitable to print the print data to the printing apparatus, and the printing apparatus prints the print data by using the transferred print program. The printing apparatus has means for storing a plurality of print programs, and the print instructing means has means for checking whether the print program suitable to print the self print data has been stored in the printing apparatus or not, the information processing apparatus has means for checking by communicating with above means whether the print program suitable to print the self print program before the printing is instructed has been stored in the printing apparatus or not, and when such a print program has been stored, the print data is printed by a printing apparatus without transferring the print program from the information processing apparatus to the printing apparatus, and when the print program is not stored, the print program is transferred and, after that, the print data is printed by the printing apparatus.

When new print programs are stored into the storing means, either one (or ones) of the print programs which have already been stored can be deleted so long as no space area exists in the storing means.

The determining means stores, for instance, the number of using times at which the print program has been used to print about every print program and selects one or more print programs in which the number of using times to print is smallest as the program to be deleted.

Preferably, when the print instructing means checks whether the using print program has already been stored or not upon printing of the print data, in the case where the old version of the print program of the above print data has already been stored, the old version is replaced to the new version.

The process to check whether the print program suitable to print the self print data has been stored or not can be executed, for instance, just after the power source of the information processing apparatus was turned on or just after the information processing apparatus was connected to the printing apparatus through the communicating medium.

The process to transfer the print programs to the printing apparatus can be executed, for instance, just before or after the information processing apparatus transmits or transmitted the print data to the printing apparatus.

Information to specify the print programs stored in the printing apparatus can be also displayed on the display means in at least one of the information processing apparatus and the printing apparatus.

In at least one of the information processing apparatus and the printing apparatus, the print programs stored in the printing apparatus can be also deleted by an operator using the inputting means.

In the case where the information processing apparatus (such as a word processor or the like) executes the printing by using the printing apparatus (print server or the like), the information processing apparatus first inquires whether the print program which can print the print data to be printed has been stored (registered) in the print apparatus or not. In response to the above inquiry, the printing apparatus checks to see if the print program has been stored in the printing apparatus or not. The printing apparatus transmits the check result to the information processing apparatus. The information processing apparatus receives the check result. When the information processing apparatus recognizes that the check result indicates that the print program which can print the print data to be printed is not registered in the printing apparatus, the print program which can print the print data is transmitted to the printing apparatus. In response to it, the printing apparatus receives the print program from the information processing apparatus and stores the print program into the print program storing means.

In the information processing apparatus, when the print data and an identifier to specify the print program which can print the print data are transmitted to the printing apparatus, the printing apparatus receives the print data and the identifier. Then, the printing apparatus prints the print data by using the print program stored in the print program storing means corresponding to the identifier.

As mentioned above, the print program which can print the print data which is produced by the information processing apparatus is transferred from each information processing apparatus to the printing apparatus and is registered. In the printing apparatus, the print data received from the information processing apparatus is printed by the print program corresponding to the print data, so that the printing apparatus can accept the print commands of various kinds of information processing apparatuses, and application programs executed on the information processing. The printing apparatus to print can be commonly used by various kinds of information processing apparatuses and application programs executed on the information processing while minimizing the processing burden of each information processing apparatus.

Even in the case where the version of the application program on the information processing apparatus side has been improved, the print program of the printing apparatus side is automatically updated in correspondence to the version-up of the application program on the information processing apparatus side. Consequently, the operation to manually update the print program can be omitted and there is a remarkable effect in maintenance of the printing apparatus.

To accomplish another object mentioned above, according to another aspect of the invention, there is provided an output control system of a server which accepts data output requests from information processing apparatuses, the data is once stored into a memory device, and when a plurality of stored data exist, the data is outputted to an output apparatus in accordance with a predetermined order, wherein when the data output request is received, in the case where the data which is being outputted to the output apparatus or whose output is waited doesn't exist, the data regarding the data output request is transmitted to the output apparatus without storing into the memory device.

An information processing system based on the above output control system has: clients (information processing apparatuses) which send output commands describing the output contents to a print server; and a server for generating the contents of the output commands received from the clients by using an output apparatus, wherein it is desirable that each of the information processing apparatuses and the server comprises the following means.

(On the client side)

(1) Output command producing means for converting the data (content) into the output command which can directly control the output apparatus.

(2) Output command transmitting means for transmitting the output command produced by the output command producing means to the server.

(3) First output control means for transmitting the output command to the print server by repeating two processes such as to allow the output command producing means to produce the output command on a unit such that the output apparatus can accept even when the output command is directly transmitted to the output apparatus and to allow the output command transmitting means to transmit the produced command to the server.

(On the server side)

(4) Output command receiving means for receiving the output commands from the clients.

(5) File storing means for producing a spool file and for storing the output commands received from the clients into the spool file.

(6) Spooling output means for transmitting the output commands stored in the spool file to the output apparatus in accordance with a predetermined order and for outputting.

(7) Second output control means for allowing the output command receiving means to receive the output commands from the clients and transmitting directly the output commands to the printer for outputting, in the case where a spooling file which is being outputted or whose output is waited doesn't exist.

(8) Third output control means for allowing the output command receiving means to receive the output commands from the clients and allowing the file storing means to store the output commands into the spool file, in the case where the spooling file which is being outputted or whose output is waited exists.

(9) Fourth output control means for transmitting the output commands stored in the spool file to the printer in accordance with a predetermined order for outputting in the case where the spooling file whose output is waited exists when the output by the second output control means is finished.

When the client tries to output certain data by using the output apparatus of the server, the client first allows the output command producing means to covert the data into the output command which can directly control the output apparatus. The output command is transmitted to the server by the output command transmitting means. The conversion into the output command and its transmission are executed by the first output control means by repeating the two processes comprising the process for producing the output command on a unit such that the output apparatus can accept even when the output command is directly transmitted to the output apparatus and the process for transmitting to the server. On the other hand, in the server, the output command is received by the output command receiving means from the client. When the spooling file which is being outputted or whose output is waited doesn't exist, the output command is transmitted to the printer directly by the second output control means, thereby outputting. When the spooling file which is being outputted or whose output is waited exists, the output command is stored into the spool file by using the file storing means by the third output control means. The output commands stored in the spool file are transmitted to the output apparatus in accordance with a predetermined order such as an accepting order by the spooling output means, thereby outputting. Upon completion of the output by the second output control means, when the output waiting spooling file exists, the output commands stored in the spool file are transmitted to the printer in accordance with a predetermined order such as an accepting order by the fourth output control means, thereby printing.

As mentioned above, in the client, the output command which can directly control the output apparatus is produced and transferred to the server. In the server, when the spooling file which is being outputted or whose output is waited doesn't exist, the output command is transmitted to the printer directly and is immediately outputted. When the spooling file which is being outputted or whose output is waited exists, the output commands are stored into the spool file and are sequentially outputted, so that the waiting time until the start of the output in the case where the output data which is being outputted or whose output is waited doesn't exist can be reduced. In both of the system which outputs to the output apparatus through the server and the system which outputs to the output apparatus directly connected to the client, the output commands which are produced by the clients can be made identical. Thus, an increase in processing program of the client to produce the output command can be suppressed.

BRIEF DESCRIPTION OF THE DRAWINGS

FIG. 1 is an explanatory diagram of the connecting relation between a print server and word processors to which the invention is applied;

FIG. 2 is a hardware constructional diagram of the word processors and the print server in FIG. 1;

FIG. 11 is an explanatory diagram of a print program inquiring process;

FIG. 12 is an explanatory diagram of a print program checking process;

FIG. 13 is an explanatory diagram of a print program transmitting process;

FIG. 14 is an explanatory diagram of a print program registering process;

FIGS. 31A, 31B and 31C are diagrams showing examples of error messages which are displayed on a display device when a fault occurs in a print server in the embodiment.

DESCRIPTION OF THE PREFERRED EMBODIMENTS

Figure 3:
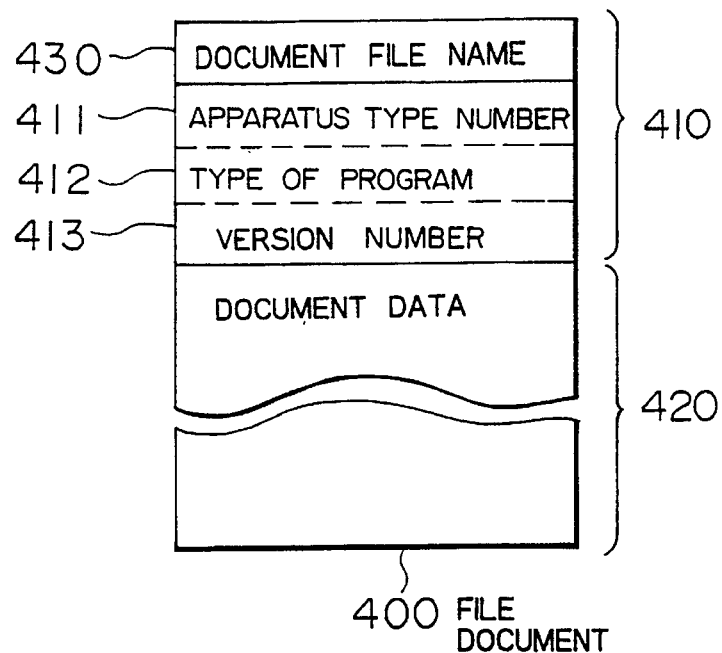
FIG. 3 is an explanatory diagram of a data structure of a document file which is used in an embodiment of a printing system of the invention.

An embodiment of the invention will be described hereinbelow with reference to the drawings. The embodiment shows an example in which the invention is applied to a system comprising a plurality of word processors and a print server to print document files formed by the word processors.

FIG. 1 shows an example of the connecting relation between the word processors and the print server according to the invention. Reference numerals 201a to 201c denote word processors and 202 indicates a print server. The word processors 201a to 201c and the print server 202 are mutually connected by an LAN 203. Document files formed by the word processors are transferred to the print server 202 through the LAN 203 and can be printed.

A hardware construction of the word processors 201a to 201c and the print server 202 shown in FIG. 1 will now be described with reference to FIG. 2.

The hardware construction of the word processors 201a to 201c will be first explained. Reference numeral 10 denotes a central processing unit (CPU). The CPU 10 executes various types of processing programs regarding the formation of a document, the transfer of a document file 400 or a print program file 700, which will be explained hereinlater, and the like and controls peripheral appratuses. Reference numeral 11 denotes a main memory (MM). Various types of processing programs such as a print program 2010, which will be explained hereinlater, and the like and the data regarding those processing programs are stored into the main memory 11. Reference numeral 12 denotes a video memory (VRAM). A content of the VRAM 12 is displayed on a display device 15. The editing of a document, the instruction of the printing to the print server, and the like are executed through a keyboard (KB) 13 and a mouse 14. The display device (CRT) 15 displays a screen to present a document, a screen to instruct the printing, a screen to list print programs 1600b (FIG. 9), which will be explained hereinlater, and the like. Reference numeral 16 dentoes a hard disk drive device (HDD) for reading out and storing the various types of processing programs, document file 400, and the like. Reference numeral 17 denotes a communication control unit (CDRV) for communications with another word processor 201 and the print server 202 through the LAN 203. Reference numeral 18 denotes a bus to transfer data between the above peripheral apparatuses 11 to 17 and the CPU 10.

The hardware construction of the print server 202 shown in FIG. 1 will now be described with reference to FIG. 2. Reference numeral 20 denotes a central processing unit (CPU). The CPU 20 receives the document file 400 (FIG. 3) and the print program file 700 (FIG. 6), executes various types of processing programs regarding the printing, and controls the peripheral apparatuses. Reference numeral 21 denotes a main memory (MM). The various types of processing programs and the data regarding those processing programs are stored into the main memory 21. Reference numeral 22 denotes a video memory (VRAM). A content of the VRAM 22 is displayed on a display device 25. An instruction to the print server is performed via a keyboard (KB) 23 and a mouse 24. The display device (CRT) 25 displays a screen to instruct to the print server and the like. Reference numeral 26 denotes a hard disk drive device (HDD) for reading out and storing the print program file 700, document file 400, and the like. Reference numeral 28 denotes a communication control unit (CDRV) which communicates with the word processors 201a to 201c through the LAN 203. Reference numeral 27 denotes a printer apparatus to print a document and 29 indicates a bus to execute the data transfer between the above peripheral apparatuses 21 to 28 and the CPU 20.

The document file according to the invention will now be described with reference to FIG. 3. The document file 400 comprises a data type 410, a document data 420, and a document file name 430. The document file name 430 indicates the name of the document file 400. Data to print a character, a figure, an image, or the like is described in the document data 420. The document data type portion 410 comprises: an apparatus type number 411 indicative of the type of word processor which has edited the document data 420; a program type 412 indicative of the type of print program 720 which is necessary to print the document data 420; and a version number 413 indicating whether the print program 720 is old or new. The data described in the document data 420 can be printed only by using the print program 720 (which will be explained hereinlater) corresponding to the information described in the document data type portion 410.

Figure 4:
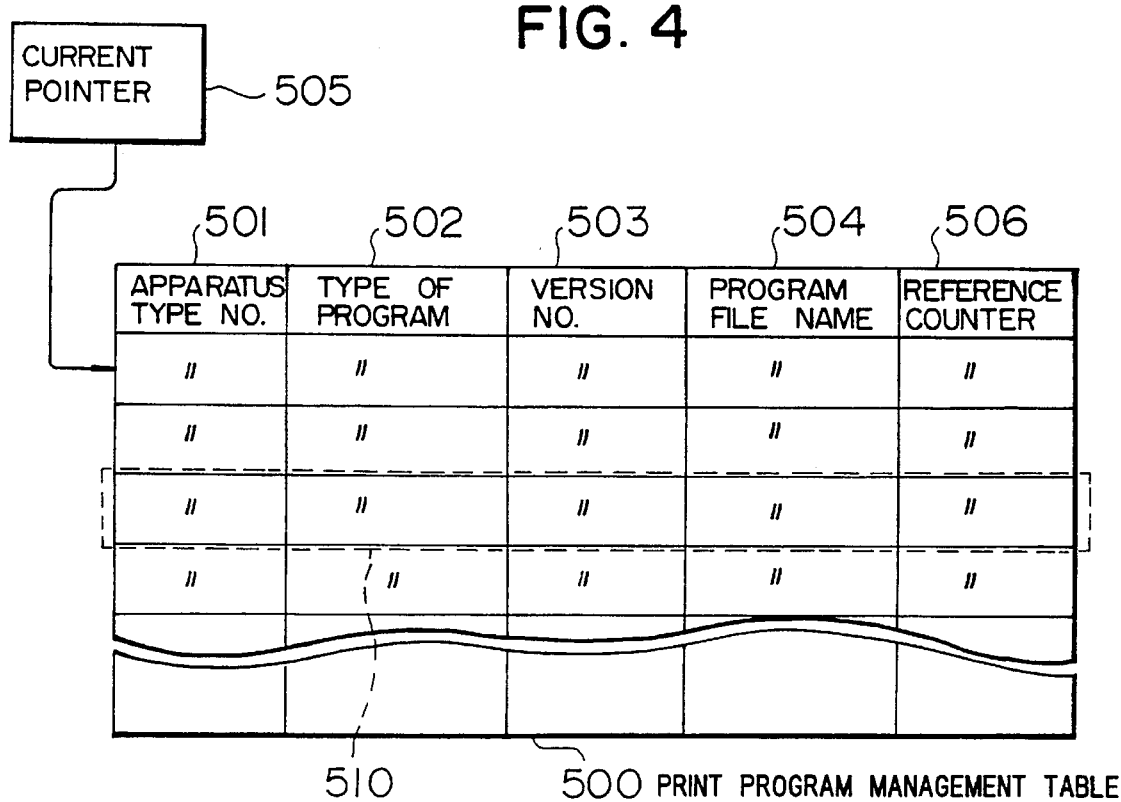
FIG. 4 is an explanatory diagram of a data structure of a print program management table according to the embodiment of the invention.

A print program management table of the print server 202 according to the invention will now be described with reference to FIG. 4. A print program management table 500 is used to manage the various types of print program 720 stored in the hard disc drive device 26 of the print server 202. The table 500 is also stored onto the Hard disk drive device 26. The print program management table 500 comprises a set of records 510 describing the information regarding the print programs 720. In each record 510, there are described: an apparatus type number 501 indicative of the type of word processor; a program type 502 indicative of the type of print program file (which will be explained hereinlater) 700; a version number 503 indicating whether the print program file 700 is old or new; a program file name 504 indicative of the name of print program file 700 in which the print program 720 is stored; and a reference counter 506 indicative of the number of using times at which a printing process 142 (FIG. 10) of the print server 202 has used the print program 720. Among them, the information 501 to 503 correspond to the information 411 to 413 described in the document data type portion 410 in the document file 400 described before by using FIG. 3. In a current pointer 505 indicative of the print program file 700 used by the print server 202 for the last printing, the top position of the record 510 corresponding to the print program file 700 is described as offset position from the top of the print program management table 500.

The print queue of the print server 202 according to the invention will now be described with reference to FIG. 5. A print queue 600 is used to store the print waiting order of the document file 400 in the print server 202. The print queue 600 is constructed by a queue head 610 and queue blocks 620 (620a, 620b, 620c, . . . ) corresponding to each document file 400. The queue head 610 and the queue blocks 620 are mutually coupled by pointers. The queue block 620 is constructed by: an up pointer 622 to refer to the queue block 620 in the direction of the queue head 610; a down pointer 621 to refer to the queue block 620 in the direction opposite to that of the queue head; and a document file name 623 of the document file 400 corresponding to the queue block 620. The print queue 600 manages the print waiting order of the document files 400. The registration of the document file 400 into the print queue 600 denotes that the queue block 620 describing the document file name 430 of the document file 400 is connected to the last queue block 620. The printing is executed from the document file 400 of the document file name 623 described in the queue block 620 connected to the queue head 610. After completion of the printing, the queue block 620 is deleted, and the next queue block 620 is connected to the queue head 610.

Figure 6:
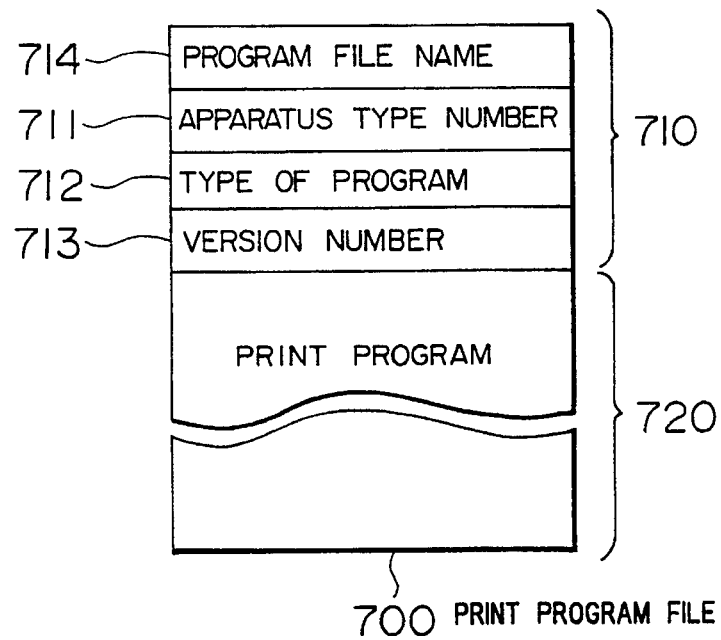
FIG. 6 is an explanatory diagram of a data structure of a print program.

The print program file 700 according to the invention will now be described with reference to FIG. 6. The print program file 700 stores the print program 720. The print program 720 is a processing program for interpreting the document file 400 (FIG. 3) in which the data which expresses a character, a figure, or the like is stored, for producing a binary image to print, for controlling the printing apparatus 27, and for printing onto a paper. The print program file 700 has a data construction shown in FIG. 6. That is, the print program file 700 comprises a program type portion 710 and the print program main body 720. the program type portion 710 comprises: a program file name 714 indicative of the file name of the print program file 700; an apparatus type number 711 indicative of the type of the word processor 201 which uses the print program 720 stored; a program type 712 indicative of the type of the print program 700 such as program to print the document, program to print statistic data, or the like; and a version number 713 indicating whether the print program 720 is old or new.

Figure 7:
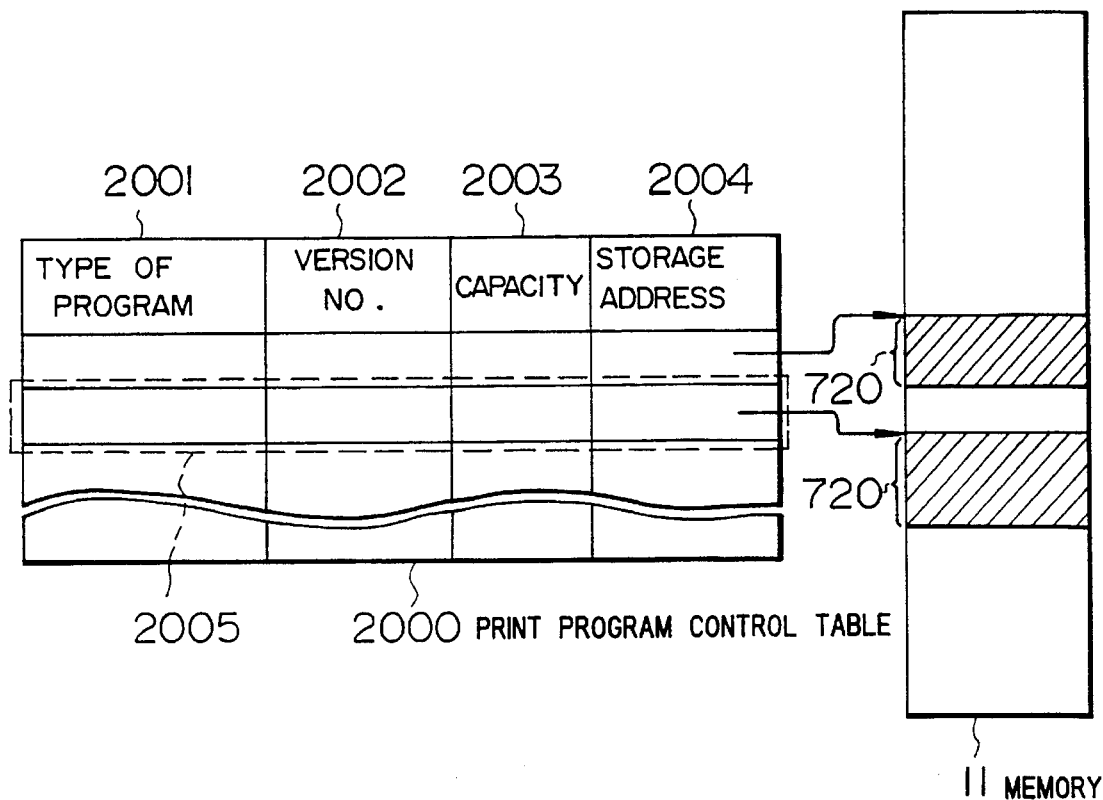
FIG. 7 is an explanatory diagram of a data structure of a print program control table.

A print program control table 2000 of the word processor 201 according to the invention will now be described with reference to FIG. 7. The print program control table 2000 is used to manage various types of print programs 720 stored in the memory 11 of the word processor 201 and is likewise stored into the memory 11. The print program control table 2000 comprises a set of records 2005 describing the information regarding the print programs 720. In each record 2005, there are described: a program type 2001 indicative of the type of print program 720; a version number 2002 indicating whether the print program 720 is old or new; a program capacity 2003 indicative of the capacity of the print program 720; and a storage address 2004 indicative of the position in the memory 11 at which the print program 720 is stored. Among them, the information 2001 and 2002 correspond to the information 412 and 413 described in the document data type portion 410 of the document file 400 which has been described before by using FIG. 3.

Figure 8:
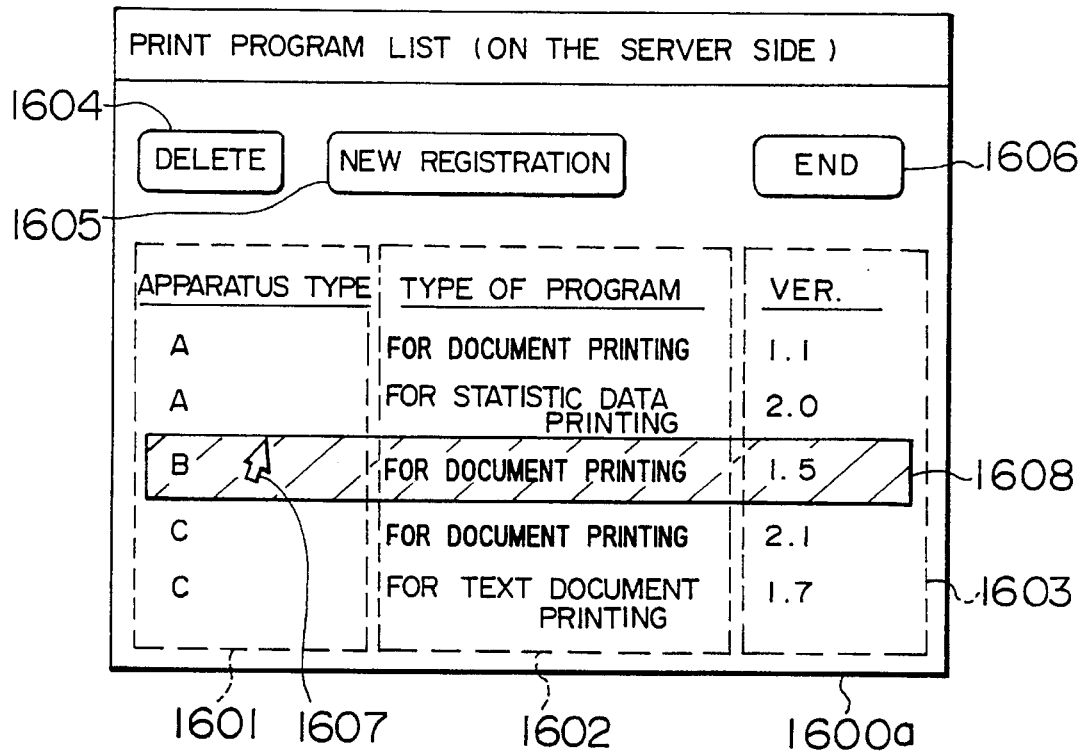
FIGS. 8 and 9 show examples of print program list display screens.
Figure 9:
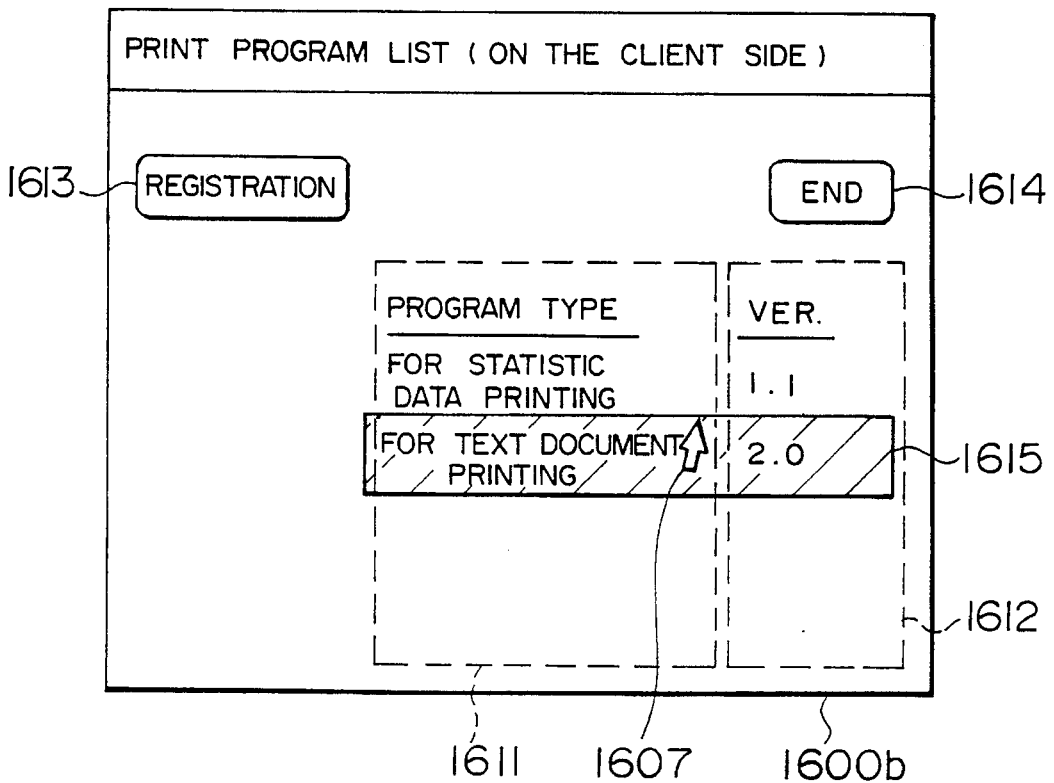

A print program list screen which is displayed on the display device 15 of the word processor will now be described with reference to FIGS. 8 and 9. The print program list screen includes: a screen 1600a to display a list of the print program files 700 stored in the print server 202; and the screen 1600b to display a list of the print programs 720 prepared in the word processor 201 (on the client side).

The screen of print program list 1600a will be first explained. An apparatus type 1601, a program type 1602, and a version 1603 with respect to each of the print program files 700 registered in the print server are displayed in the screen of print program list 1600a. The information 1601, 1602, and 1603 are respectively displayed in correspondence to the apparatus type number 501, program type 502, and version number 503 described in the print program management table 500. Reference numerals 1604, 1605, and 1606 denote click boxes. By indicating the click boxes 1604 to 1606 by a mouse cursor 1607 which is operated by using the mouse 14, a proper instruction is performed to the word processor 201. Reference numeral 1604 denotes the deletion click box to instruct the deletion of the print program file 700. In the case of deleting the print program file 700 which has already been registered, the line 1608 displayed the print program file 700 which will be deleted by instructing with the mouse cursor, and the area 1608 is displayed by inverting the black and white display state (1608). After that, the deletion click box 1604 is indicated. Reference numeral 1605 denotes the click box for transferring the print program 720 corresponding to the type of the word processor 201 which is being used to the print server 202 from the word processor 201 and for registering. By indicating the click box 1605, the print program list screen 1600b to select the print program 720 to be registered is displayed. Reference numeral 1606 denotes the click box to finish the screen of print program list displaying 1600a.

The screen of print program list 1600b will now be described. Program types 1611 and 1612 are displayed in the screen of print program list 1600b with respect to each print program 720 which is used in the word processor 201. The information 1611 and 1612 are respectively displayed in correspondence to the program type 2001 and version number 2002 described in the print program control table 2000 which has been described in FIG. 7. Reference numeral 1613 denotes the registration click box to indicate the registration of the print program 720 into the print server 202. The line displayed with regard to the print program 720 to be registered by the mouse cursor is indicated and displayed by inverting the black and white display state (1615). After that, the registration click box 1613 is indicated. Reference numeral 1614 denotes a click box to finish the print program list display screen 1600b. The display is returned to the screen 1600a by indicating the click box 1614.

Figure 10:
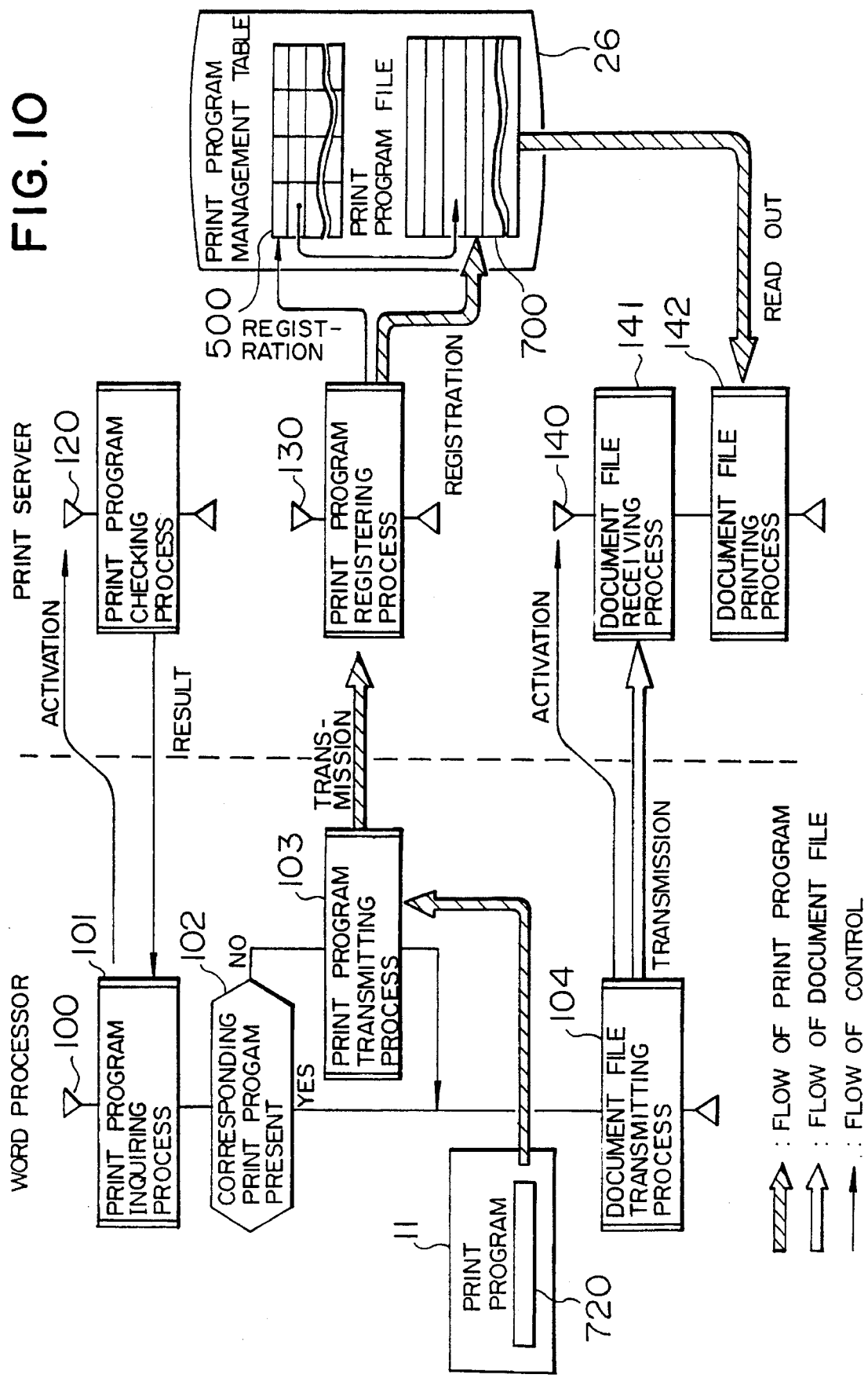
FIG. 10 is an outline explanatory diagram of a printing process in the printing system according to the embodiment of the invention.

The outline of the printing process in the system comprising the word processor 201 and the print server 202 with the above-described construction will now be described with reference to FIG. 10. In FIG. 10, a printing process 100 is a process which is executed by the word processor 201. A print program checking process 120, a print program registering process 130, and a printing process 140 are processes which are executed by the print server 202. The processes 120, 130, and 140 of the print server 202 are controlled under a multitask operating system.

In the word processor 201, when the printing process 100 to print the document file 400 is activated, a print program inquiring process 101 is first executed in the printing process 100. In the print program inquiring process 101, the print program checking process 120 of the print server 202 is activated and a check is made to see if the print program 720 which can print the document file 400 to be printed has been registered in the print server 202 or not. When the print program 720 is not registered in the print server 202 (step 102), the print program 720 in the memory 11 which can print the document file 400 is transferred as a print program file 700 to the print server 202 from the word processor 201 by a print program transmitting process 103. The print server 202 receives the print program file 700 from the word processor 201 and stores into the Hard disc drive device 26. In the printing process 100 of the word processor 201, the document file 400 to be printed is transferred to the print server 202 by the document file transmitting process 104. The print server 202 receives the document file 400 from the word processor 201 (step 141) and prints by using the print program 700 which can print the document file 400 (step 142).

The above processes will now be described in detail. The print program inquiring process 101 and the print program checking process 120 will be first explained with reference to FIGS. 11 and 12. In the print program inquiring process 101, the print program checking process 120 of the print server 202 is first activated (step 801). The apparatus type number 411, program type 412, and version number 413 in the document file 400 to be printed are notified to the print program checking process 120 (step 802). In the print program checking process 120, the apparatus type number 411, program type 412, and version number 413 are received from the word processor 201 (step 1001). Those information 411 to 413 are used as search keys and the print program management table 500 shown in FIG. 4 is searched (step 1002). When there is the record 510 having the same apparatus type number 501, program type 502, and version number 503, the presence of the print program file 700 corresponding to the document file 400 to be printed is notified to the word processor 201, and when such a record 510 doesn't exist, the absence of the corresponding print program file 700 is notified to the word processor 201 (steps 1003, 1004, 1005). The print program inquiring process 101 of the word processor 201 receives the above notification result information (step 803).

The print program transmitting process 103 and the print program registering process 130 will now be described with reference to FIGS. 13 and 14. In the print program transmitting process 103, the print program registering process 130 of the print server 202 is first activated (step 901). The apparatus type number 711, program type 712, and version number 713 shown in the print program file 700 to be transmitted are notified to the print program registering process 130 of the print server 202 (step 902). In the print program registering process 130, the apparatus type number 711, program type 712, and version number 713 are received (step 1101). The correspondence relations with the apparatus type number 501, program type 502, and version number 503 in the print program management table 500 shown in FIG. 4 are checked (steps 1102, 1103). When there is not a record 510 which coincides with the apparatus type number 711 and program type 712, the print program file 700 is received from the print program transmitting process 103 and stored into the file (step 1104). The apparatus type number 711, program type 712, and version number 713 in the print program file 700 and the program file name 714 of the print program file 700 are newly registered into the print program management table (step 1105). When the version number 713 is larger than the version number 503 (namely, this means that the program is newer) and there is the record 510 having the same apparatus type number 711 and program type 712, the print program file 700 of the program file name 504 described in the record 510 is deleted (step 1106). After that, the new print program file 700 is received from the print program transmitting process 103 of the word processor 201 (step 1107). The version number 503 in the print program management table 500 is rewritten to the version number 713 of the received print program 700 (step 1108). In the process 903 of the word processor 201, the print program file 700 is produced from the print program 720 in the memory 11 and transmitted to the print server 202. In the processes 1104 and 1107 to receive the print program file 700, when an area in the Hard disc drive device 26 to store the print program file 700 isn't enough (steps 1109, 1110), the print program file 700 whose use frequency is the smallest is deleted by an automatic deleting process 1900. After that, the process 1104 or 1107 is executed.

Figure 15:
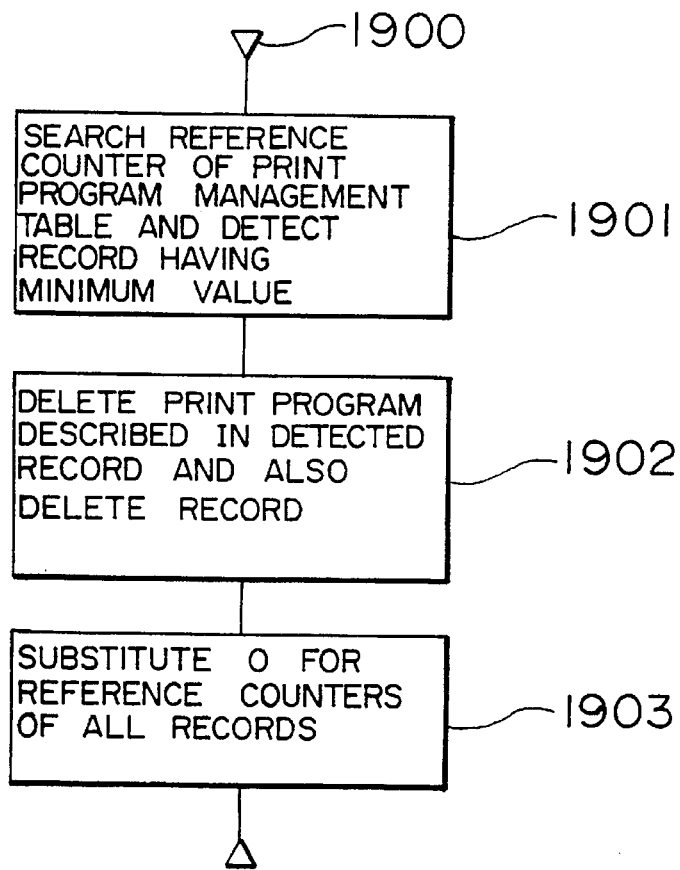
FIG. 15 is an explanatory diagram of a print program automatic deleting process.

The automatic deleting process 1900 will now be described with reference to FIG. 15. The automatic deleting process 1900 is a process to delete the print program file 700 whose use frequency is the smallest. In the print program management table 500, the record 510 in which the value of the reference counter 506 is the smallest is detected (step 1901). The print program file 700 of the program file name 504 described in the record 510 and the record 510 are deleted (step 1902). "0" is substituted for the values of the reference counters 506 of all of the records 510 in the print program management table 500 (step 1903). Although the print program file in which the value of the reference counter is the smallest has been selected as a program to be deleted, a well-known substituting algorithm such as FIFO, LRU, or the like or a combination of a plurality of algorithms can be also applied.

Figure 16:
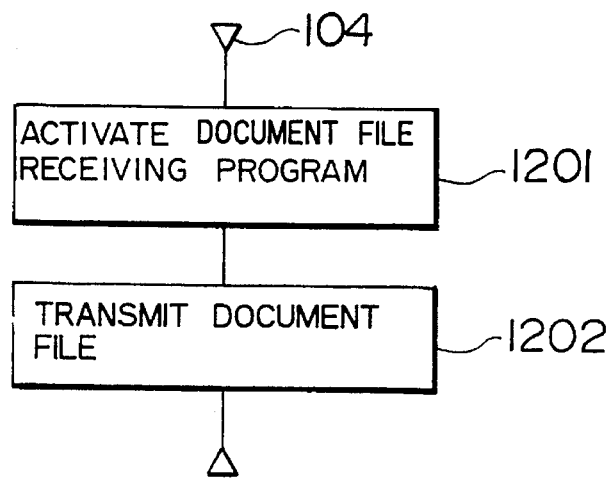
FIG. 16 is an explanatory diagram of a document file transmitting program.
Figure 17:
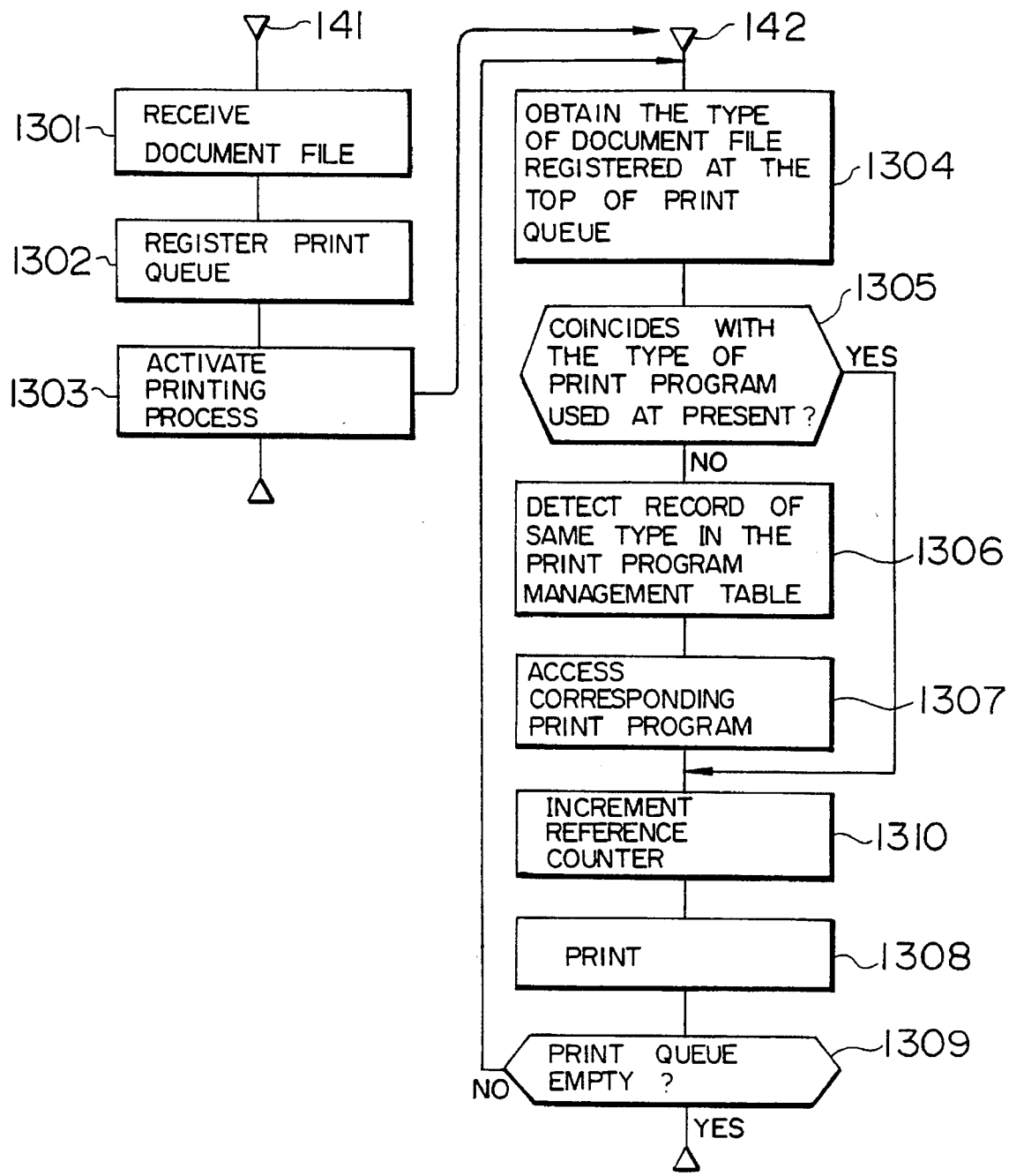
FIG. 17 is an explanatory diagram of a printing process.

The document file transmitting process 104, document file receiving process 141, and document file printing process 142 will now be described with reference to FIGS. 16 and 17. In the document file transmitting process 104, a document file receiving process 141 of the print server 202 is first activated (1201). The document file 400 to be printed is transferred to the print server 202 (step 1202). In the document file receiving process 141 of the print server 202, the document file 400 is received from the word processor 201 (1301) and is registered into the print queue 600 (1302). The document file printing process 141 is activated (1303). When the document file printing process 142 has already been activated, the process 1303 is not executed. In the activated document file printing process 141, the apparatus type number 411 and program type 412 of the document file 400 of the document file name 623 registered in the top of the print queue 600 are read out (1304). A check is made to see if those information coincide with the apparatus type number 501, program type 502, and version number 503 described in the record 510 which is indicated by the current pointer 505 in the print program management table 500 or not (1305). When there is any one of the information which doesn't coincide, the record in which all of the above information coincide is detected (1306) in the print program management table 500. The print program 720 stored in the print program file 700 of the program file name 504 described in such a record 510 is read out into the main memory 21, thereby setting a state in which the printing process by the print program 720 can be executed (1307). At this time, "1" is added to the value of the reference counter 506 of the record 510 regarding the print program 720 and a fact that the print program 720 has been used once is recorded (1310). The document file 400 of the document file name 623 registered in the queue block 620 at the top of the print queue 600 is printed (1308). The above processes 1304 and 1305 are repeated until the print queue 600 becomes empty (1309).

In the embodiment, the print program 720 is transferred to the print server 202 just before the document file 400 to be printed is transferred to the print server 202. However, the following method can be also used. That is, after the document file 400 was transferred from the word processor 201 to the print server 202, when the print program 720 which can print the document file 400 is not registered in the print server 202, the print server 202 requests the word processor 201 to transfer the corresponding print program 720, and the word processor 201 transfers the print program 720 to the print server 202. The timing to register the print program 720 into the print server 202 can be also set to a timing just after the document file 400 was transferred or a timing just before the document file 400 is printed.

Figure 18:
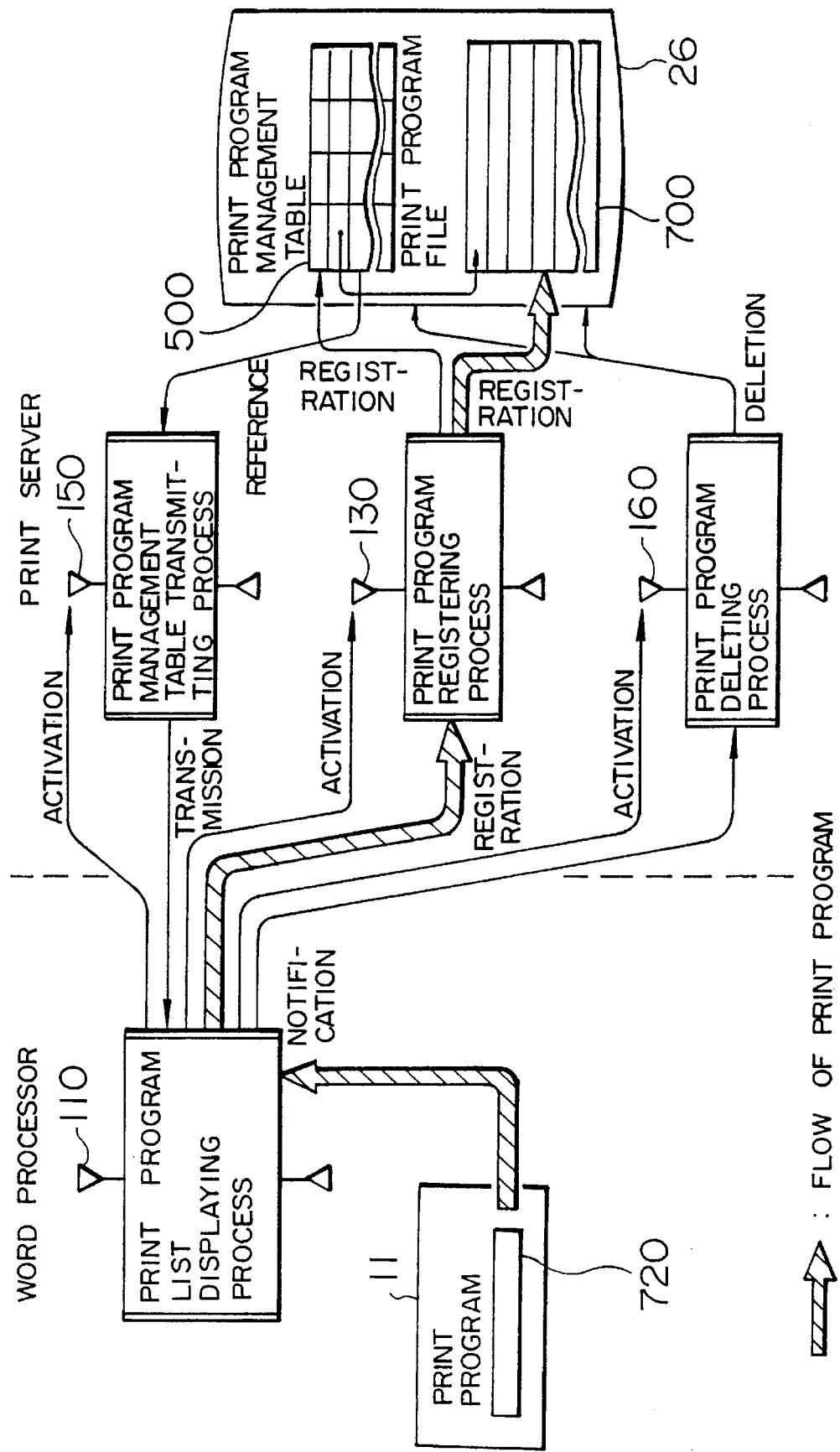
FIG. 18 is an explanatory diagram of a print program list displaying process.

The outline of the print program list displaying process will now be described with reference to FIG. 18. The user of the word processor 201 can refer to the list of the print programs registered in the print server 202 by seeing the screen of the display device 15. In FIG. 18, the print program list displaying process 110 is a process which is executed by the word processor 201. The print program registering process 130, print program management table transmitting process 150, and print program deleting process 160 are processes which are executed by the print server 202. The processes 130, 150, and 160 of the print server 202 are controlled under the multitask operating system. In the word processor 201, when the print program list displaying process 110 is activated, the process 110 obtains the information in the print program management table 500 by using the print program management table transmitting process 150 of the print server 202 and displays the print program list screen 1600a (FIG. 16) onto the screen of the display device 15. When the operator further instructs the new registration of the print program 720, the process 110 newly registers the print program 720 to the print server 202 by using the print program registering process 130 of the print server 202. When the operator instructs the deletion of the print program 720, the print program 720 registered in the print server 202 is deleted by using the print program deleting process 160 of the print server 202.

Figure 19:
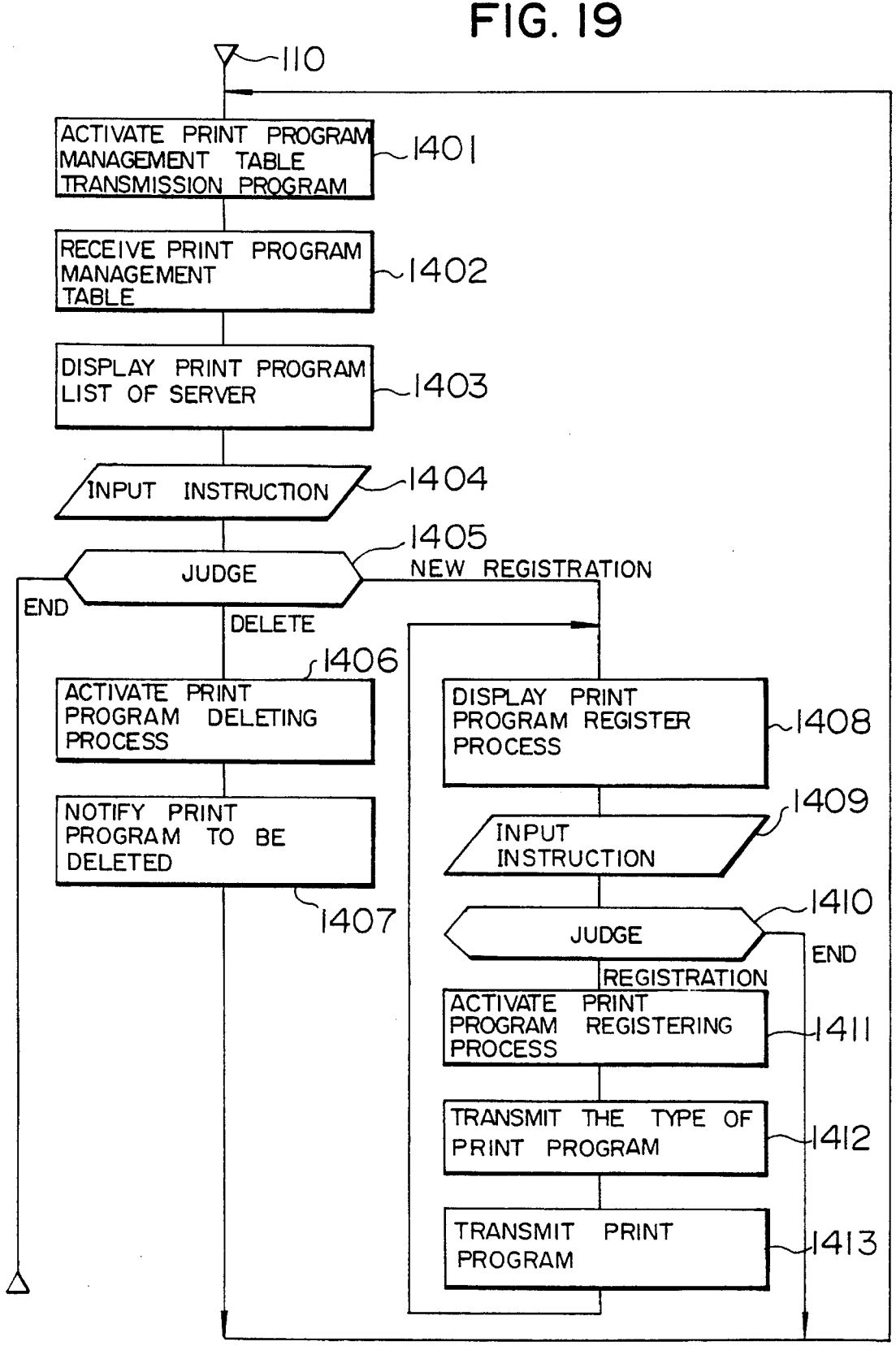
FIG. 19 is an explanatory diagram of a print program list displaying process.
Figure 20:
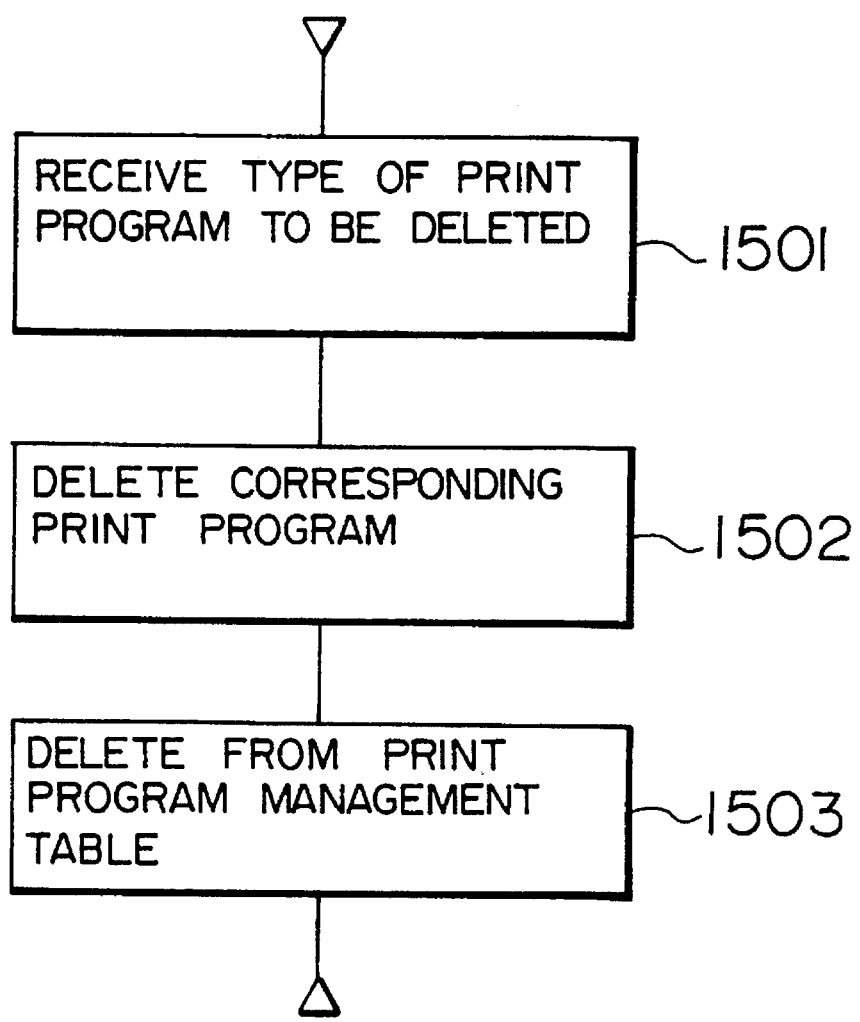
FIG. 20 is an explanatory diagram of a print program deleting process.

The print program list displaying process 110 and the print program deleting process 160 mentioned above will now be described in detail with reference to FIGS. 19, 20, and 8. First, the print program management table transmitting process 150 of the print server 202 is activated (1401) in the print program list displaying process 110. The print program management table 500 is received from the print server 202 (1402). The print program list screen 1600a which has already been described by using FIG. 16 is displayed on the screen of the display device 15 (1403). When the user indicates the deletion of a particular print program 720 on the print program list screen 1600a (1404, 1405), the print program deleting process 160 of the print server 202 is activated (1406). The apparatus type number 501 and the program type 502 of the print program 720 whose deletion has been indicated are notified to the print program deleting process 160 (1407). In the print program deleting process 160 of the print server 202, the apparatus type number 501 and the program type 502 of the print program 720 to be deleted are received from the word processor 201 (1501). The print program file 700 in which the corresponding print program 720 is stored is deleted (1502). The record 510 corresponding to the print program file 700 in the print program management table 500 is deleted (1503). When the operator instructs to newly registering the print program 700 corresponding (which can print the document which is edited by the word processor) to the word processor 201 which is being used (1404, 1405) into the print server 202, the list of print program list 1600b which has already been described by using FIG. 9 is displayed on the screen of the display device 15 with reference to the print program control table 2000 (1408). When the user instructs the registration of the print program 720 (1409, 1410), the print program registering process 130 (FIG. 18) of the print server 202 is activated (1411). The print program file 700 in which the print program 720 is stored is transferred to the print program registering process 130 and registered (1412, 1413). When the operator instructs the end of the screen 1600b (1404, 1405), the previous screen is again displayed. In the embodiment, the print program list screen 1600a has been displayed on the screen of the display device 15 of the word processor 201. However, by providing the similar mechanism to the print server 202, the display of the list of the print programs 720 and the deletion of the print program 720 can be instructed on the print server 202 side.

In the above embodiment, the print program 720 which can print the document file 400 formed by the word processor 201 is transferred from each of the word processors 201 to the print server 202 and registered. In the print server 202, the document file 400 received from the word processor 201 is printed by using the print program 720 which can print the document file 400. Thus, the print server 202 can accept the request of printings of various types of the print data depending on the difference between various types of word processors 202 or application programs. The print server 202 can be commonly used by various types of word processors 201 while minimizing the processing burdens of the word processors 201. When the print program 720 is newly registered into the print server 202, in the case where the print program of the old version of the above print program 720 has been registered in the print server 202, by deleting the print program 720 of the old version, the Hard disk drive device 26 to store the print programs 720 is effectively used. The user can see the types of print programs stored in the print server 202 by displaying onto the screen 1600a of the display device 15 of the word processor 201. The user consequently can check which types of print programs 720 have been registered in the print server 202. Further, the user can delete the print program 720 stored in the print server 202 by an instruction from the word processor 201. The user can register the print program 720 corresponding to the type of the word processor 201 which is being used into the print server 202 by an instruction in the word processor 201.

In the above embodiment, when the document file 400 is transferred to the print server 202, print program 720 which can print the document file 400 is transferred to the print server 202. However, the following embodiment is also considered. That is, the print program 720 of the word processor 201 is transferred to the print server at a time point when the word processor 201 is connected to the LAN 203 and the communication with the print server 202 can be performed or a time point when the power source of the word processor 201 is turned on.

Figure 21:
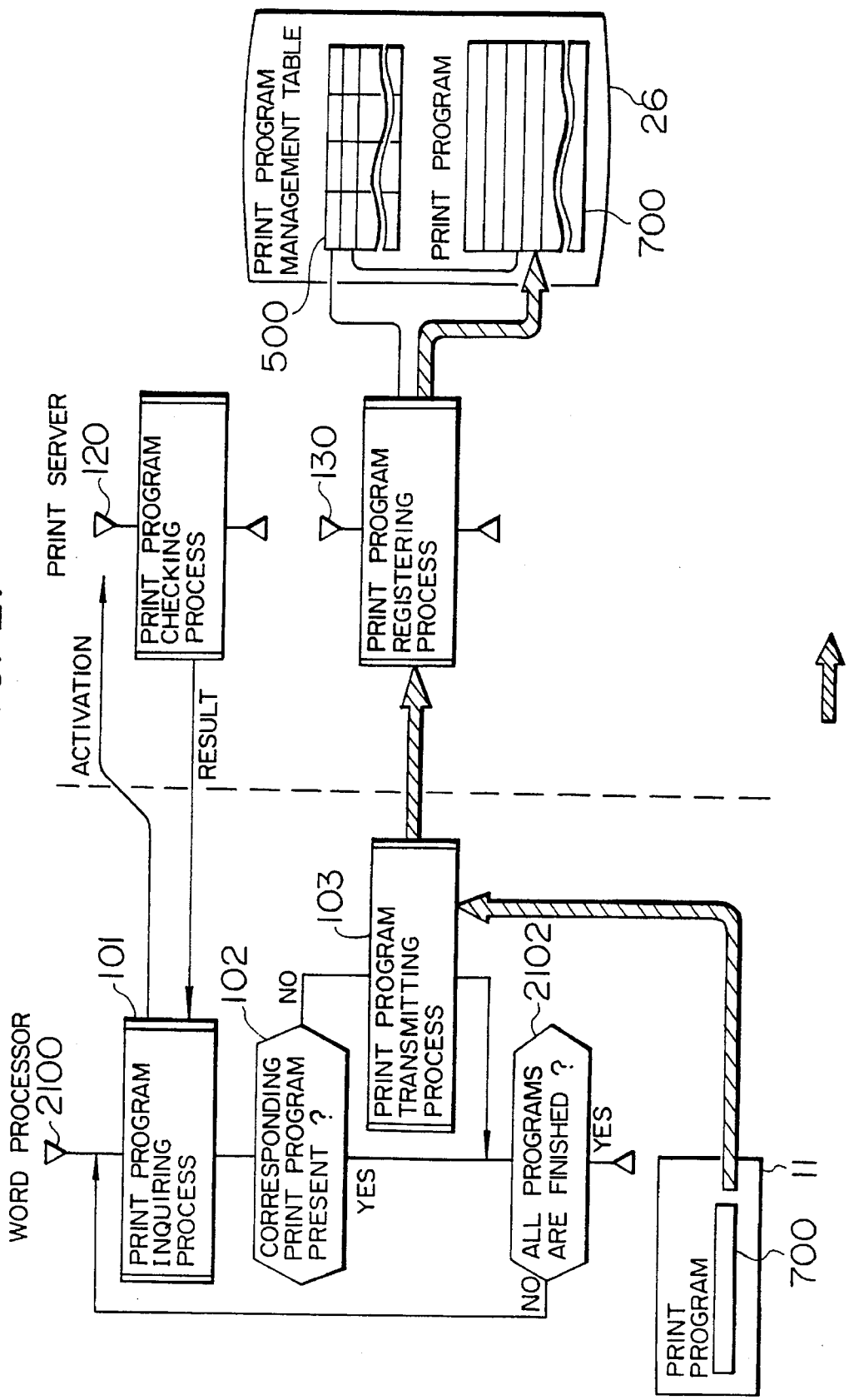
FIG. 21 is an explanatory diagram of a print program initial registering process.

A print program initial registering process 2100 to realize the above construction will now be described with reference to FIG. 21. The print program initial registering process 2100 is a process of the word processor 201 which is activated at the above time point. In the print program initial registering process 2100, the print program inquiring process 101 described in the above embodiment is executed with respect to all of the print programs 720 registered in the print program control table 2000 and the print program transmitting process is performed as necessary (2101–2102). That is, the print programs which are not registered in the print server 202 among the print programs 720 registered in the print program control table 2000 are transferred to the print server 202 and are registered. The relations among the processes 101 to 103, 120, and 130 are the same as those described before by using FIG. 10. Even in the case where the print programs 720 have initially been registered into the print server 202 by the print program controlling process 2100, when the document 400 is printed, the foregoing printing process 100 is executed.

In the embodiment, the print program 720 is registered into the print server 202 at a time point when the word processor 201 is connected to the LAN 203 or a time point when the power source of the word processor 201 is turned on. Therefore, the number of transferring times of the print programs 720 in the printing process 100 is small. The reduction of the time which is required until the printing is actually performed after the printing was instructed by the user can be expected.

As mentioned above, according to the embodiment, the print program corresponding to the print data which is produced by the first information processing apparatus is transferred from each of the first information processing apparatuses to the second information processing apparatus and is registered. In the second information processing apparatus, the print data received from the first information processing apparatus is printed by the print program corresponding to the print data, so that the second information processing apparatus can accept the print instruction from each of various types of first information processing apparatuses. The second information processing apparatus which performs printing can be commonly used by various types of first information processing apparatuses while minimizing the processing burden of each of the first information processing apparatuses.

Another embodiment of the invention will now be described with reference to the drawings. The embodiment also relates to an example in which the invention is applied to a system comprising a plurality of word processors and a print server to print the document files formed by the word processors in a manner similar to the first embodiment.

Since the connecting relation between the word processors and the print server is similar to that shown in FIG. 1, its description is omitted here. Document files 5000 formed by the word processors 201a to 201c are converted into print commands 7300. After that, the print commands are transferred to the print server 202 through the LAN 203 and can be printed. The document file 5000 and the print command 7300 will be described hereinlater.

A hardware construction of the word processors 201a to 201c and print server 202 is similar to that shown in FIG. 2.

The hardware construction of the word processors 201a to 201c will now be explained with reference to FIG. 2.

The central processing unit (CPU) 10 executes various kinds of processing programs regarding the editing of documents and the conversion of the document files 5000 into the print commands 7300 or the transfer of the print commands 7300 to the print server 202 and the like, which will be explained hereinlater, and controls the peripheral apparatuses. The main memory (MM) 11 stores various kinds of processing programs for the editing of the documents, printing, and the like and the data regarding the processing programs. Reference numeral 16 denotes the Hard disk drive device (HDD) from which the various kinds of processing programs, document files 5000, or the like are read out. The other units are similar to those mentioned above.

The hardware construction of the print server 202 will now be described with reference to FIG. 2.

The central processing unit (CPU) 20 executes various kinds of processing programs regarding the reception of the print commands 7300, printing, and the like and controls the peripheral apparatuses. A print command file 7000 or the like is read out from and is written into the Hard disk drive device (HDD) 26 as will be explained hereinlater.

Figure 22:
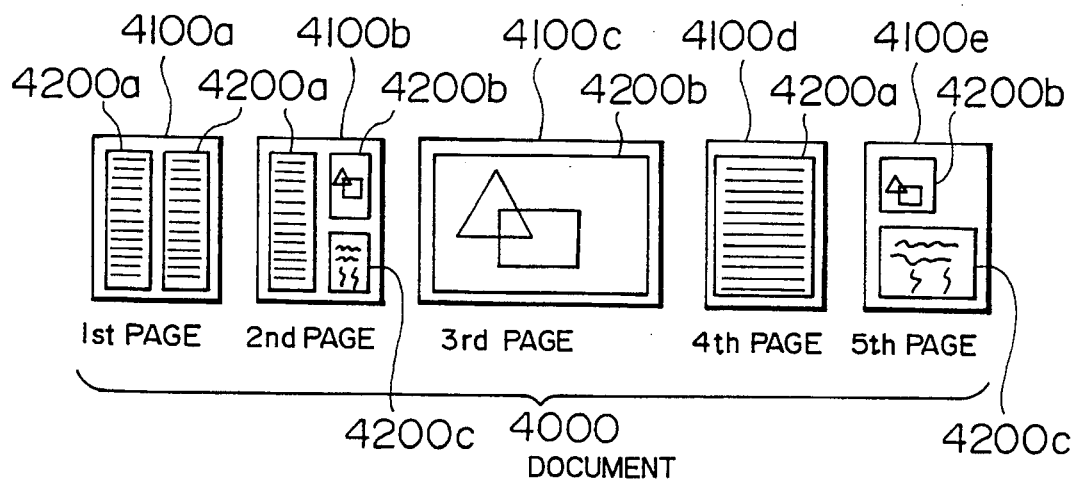
FIG. 22 is a diagram showing an example of a construction of a document in another embodiment of the invention.

An example of a construction of the document which is formed by the word processor 201 is shown in FIG. 22 and will be explained. A document 4000 comprises a plurality of pages 4100a to 4100e of different paper sizes. Each page 4100 (4100a–4100e) is constructed by one or more areas among three kinds of areas comprising a sentence area 4200a in which a sentence consisting of characters is described, a figure area 4200b in which a figure such as straight line, circle, rectangle, or the like is described, and an image area 4200c in which an image such as a photograph or the like is described.

Figure 23:
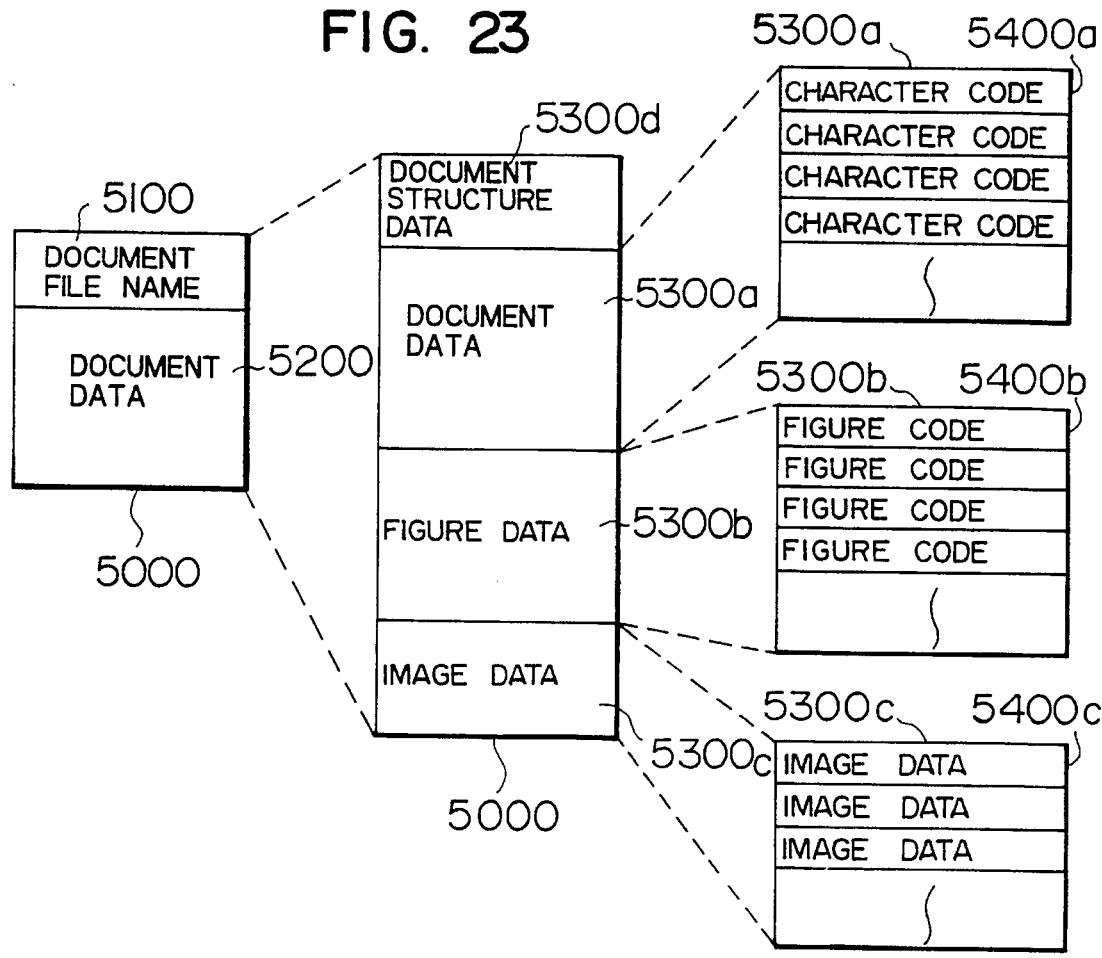
FIG. 23 is a diagram showing an example of a structure of a document file.

The document file will now be described with reference to FIG. 23. The document file 5000 comprises a document file name 5100 and document data 5200. The document file name 5100 shows the name of the document file 5000. The document data 5200 includes: document data 5300a in which the data in the document area 4200a in the document is described; figure data 5300b in which the data in the figure area 4200*b* is described; image data 5300*c* in which the data in the image area 4200*c* is described; and document constructing data 5300*d* in which the construction of the document and the relation among the data are described. The paper size of each page 4100 of the document, the size, position, and the like of each area 4200 in each page 410, and the corresponding relation between each area 4200 and each data 5300 are described in the document constructing data 5200*d*. A character code 5400*a* corresponding to each character constructing the document is stored in the document data 5300*a*. Figure codes 5400*b* corresponding to figure elements such as straight line, circle, rectangle, and the like are stored in the figure data 5300*b*. Data 5400*c* which expresses pixels of the image is stored in the image data 5300*c* on a byte unit basis.

Figure 5:
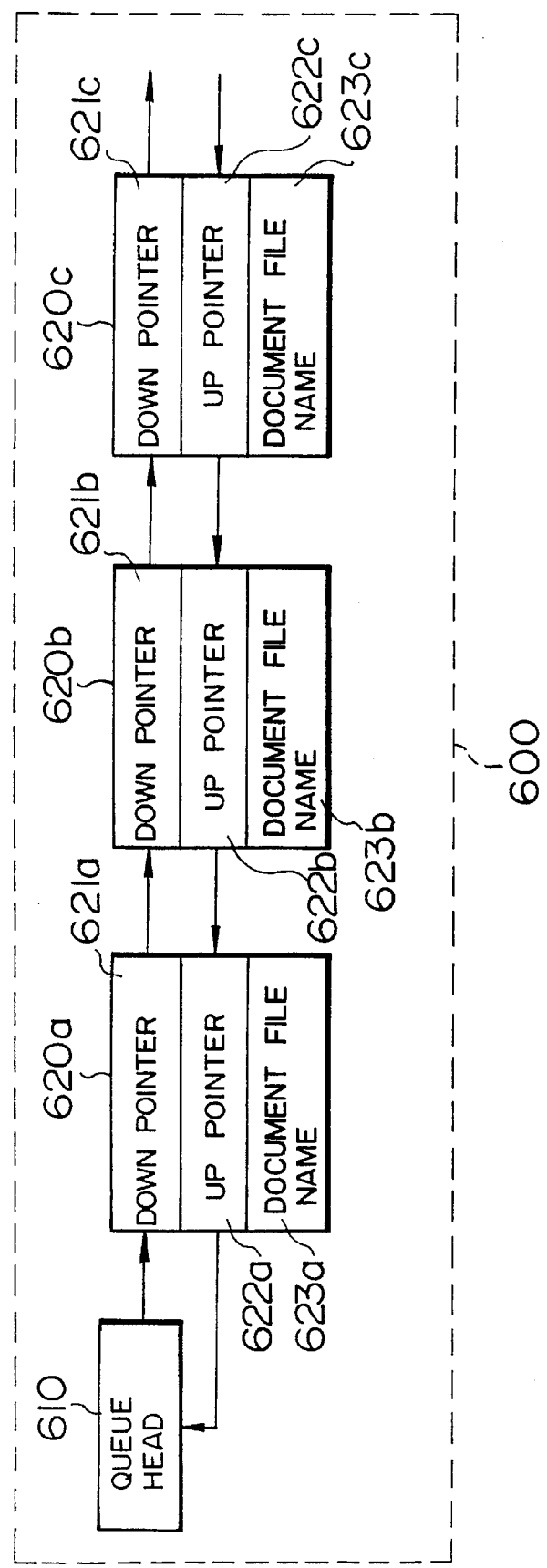
FIG. 5 is an explanatory diagram of a data structure of a print queue.

A construction of the print queue of the print server 202 is similar to that shown in FIG. 5. As for the print queue 600, the document file 400 has been stored in the first embodiment. However, in the second embodiment, the print waiting order of the print command file 7000 in the print server 202 is stored. Each of the queue blocks 620 is constructed by the up pointer 622, down pointer 621, and file name 623 describing a file name 7100 of the print command file 7000 corresponding to the queue block 620. The print queue 600 manages the print waiting order of the print command file 7000. The registration of the print command file 7000 into the print queue 600 denotes that the queue block 620 describing the file name 7100 of the print command file 7000 is connected to the last queue block 620. The printing is executed from the print command file 7000 of the file name 623 described in the queue block 620 connected to the queue head 610. After completion of the printing, the queue block 620 is deleted, and next queue block 620 is connected to the queue head 610.

Figure 24:
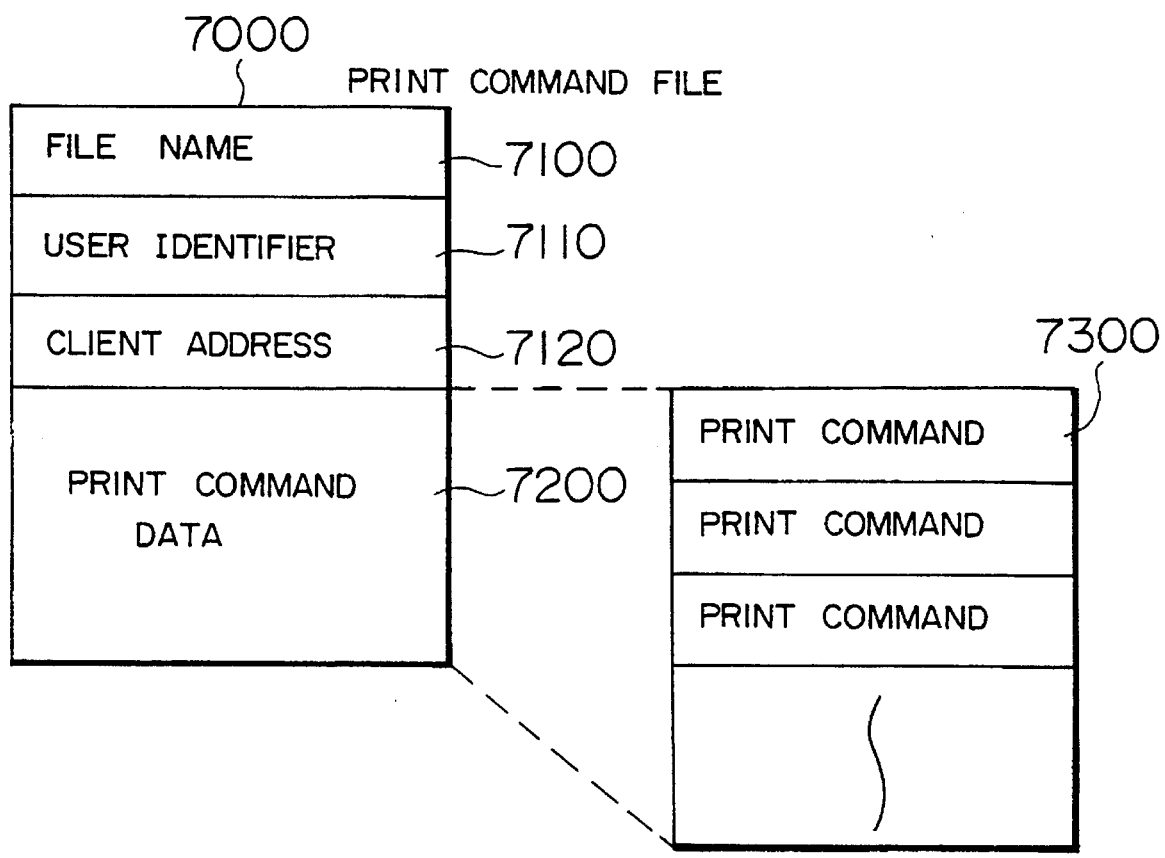
FIG. 24 is a diagram showing an example of a structure of a print command file.

A structure of the print command file will now be described with reference to FIG. 24. The print command file 7000 comprises: the file name 7100; a user identifier 7110; a client address 7120; and print command data 7200. The file name 7100 indicates the name of the print command file 7000. The user identifier 7110 specifies the user who has requested the printing, that is, the user who has been using the word processor 2101 at a start time point of a printing process A 100', which will be explained hereinlater. The users of the word processors 201 are managed by a mechanism similar to the ordinary information processing apparatuses corresponding to a plurality of users as disclosed in, for instance, JP-A-62-72049. Therefore, the user identifier of the user can be derived at the processing start time point. The name in which a part of the document file name 5100 of the document file 5000 as an original name has been changed is used as a file name 7100. The client address 7120 is an address to specify the word processor 201 on the requesting side of the printing. The print command 7300 obtained by converting the above-described document file 5000 by a method, which will be explained hereinlater, is stored as print command data 7200.

Figure 25:
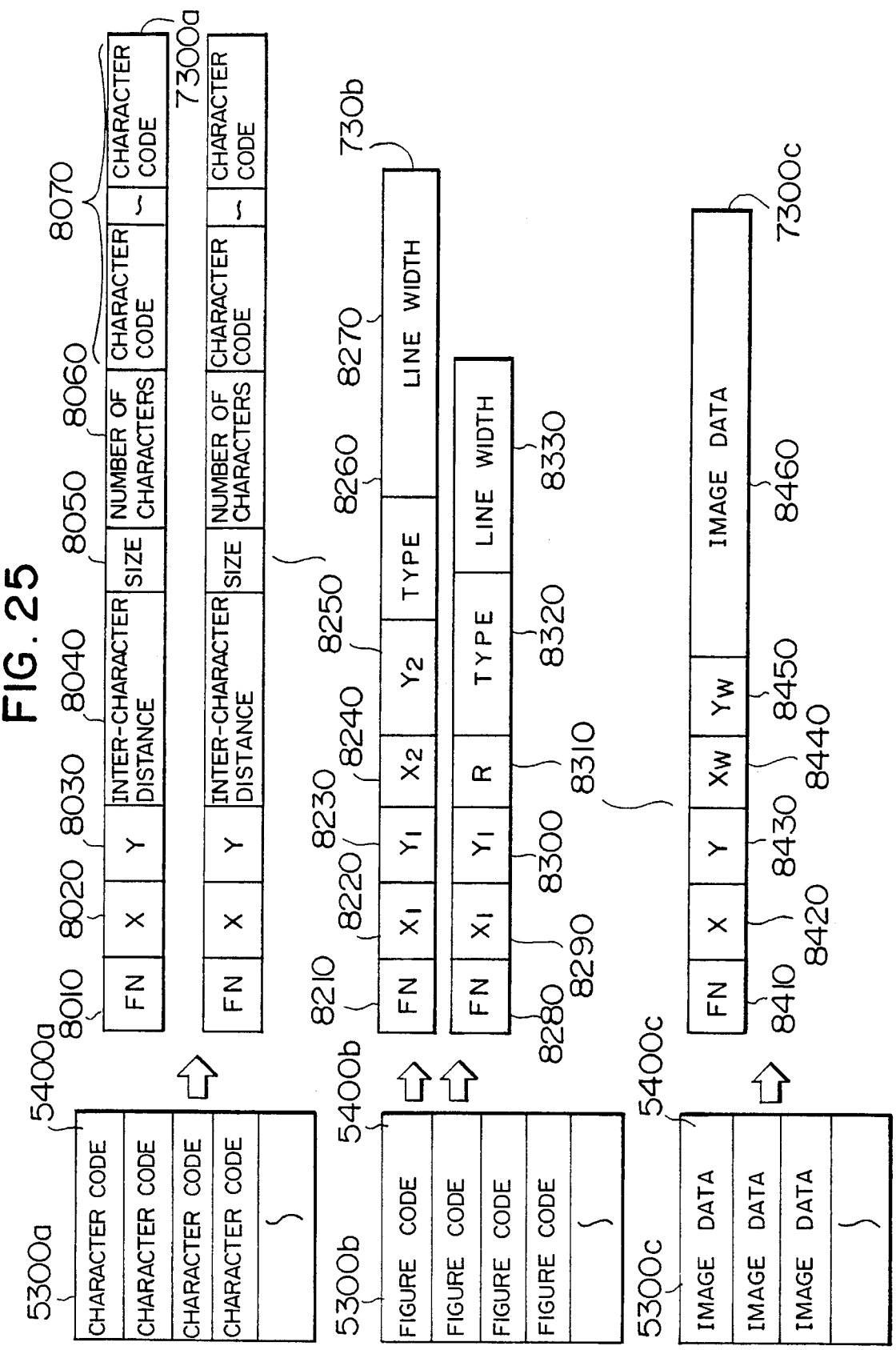
FIG. 25 is a diagram which is useful to explain the conversion from a document file to a print command.

The conversion from the document file 5000 into the print command file 7000 will now be described with reference to FIG. 25. First, the foregoing document file 5000 is converted into the print command 7300 every page 4100 of the document 4000. In the conversion of each page 4100, each data 5300 corresponding to each area 4200 included in the page 4100 is converted into the print command 7300. As for the document data 5300*a* corresponding to the document area 4200*a*, the character codes 5400*a* in the document data 5300*a* and are converted into character print commands 7300*a*. As for the figure data 5300*b* corresponding to the figure area 4200*b*, the figure codes 5400*b* in the figure data 5300*b* are converted one by one into figure print commands 7300*b*. As for the image data 5300*c* corresponding to the image area 4200*c*, the respective data 5400*c* in the image data 5300*c* are combined on a certain unit basis and are converted into image print commands 7300*c*. The character print command 7300*a* comprises: a function number 8010 indicating that, for instance, the print command is a character print command; drawing start positions 8020 and 8030 of characters in the page; a drawing interval 8040 between characters; a character size 8050; the number of characters 8060 described in the character print command; and a character code 8070. The figure print command 7300*b* comprises: a function number 8210 indicating that the print command is a print command of a straight line figure in the case where, for example, the print command indicates the drawing of a straight line figure; drawing start positions 8220 and 8230 of the straight lines in the page; drawing end positions 8240 and 8250; a line type 8260 such as solid line, broken line, or the like; and a line width 8270. For instance, when the print command indicates the drawing of a circular figure, the figure print command 7300*b* includes: a function number 8280 indicating that the print command is a print command of a circular figure; drawing positions 8290 and 8330 of the circles in the page when they are indicated by center positions of the circles; a radius 8310 of the circle; a line type 8320; and a line width 8330. The image print command 7300*c* includes: a function number 8410 indicating that, for example, the print command indicates the drawing of an image; drawing start positions 8420 and 8430 of the images in the page; sizes 8440 and 8450 in the vertical and lateral directions of the image; and image data 8460. In addition to the character print command 7300*a*, figure print command 7300*b*, and image print command 7300*c*, the print commands 7300 include: a print start notification print command indicative of the start of the printing of the document; a page print condition setting print command to set print conditions such as a paper size and the like of the page at the start of the printing of each page; a page printing end notification print command indicative of the end of the printing of each page; a document printing end notification print command indicative of the end of the printing of the document; a printing interruption instruction print command to instruct the interruption of the printing; and the like. Upon conversion into each of the print commands 7300, the coordinate values 8020, 8030, 8220, 8230, 8240, 8250, 8290, 8300, 8420, and 8430 are determined in consideration of the position and size of each area in the page with reference to the document constructing data 5300. The print commands 7300 can be printed even when they are directly transmitted to the printing apparatus 27.

Figure 26:
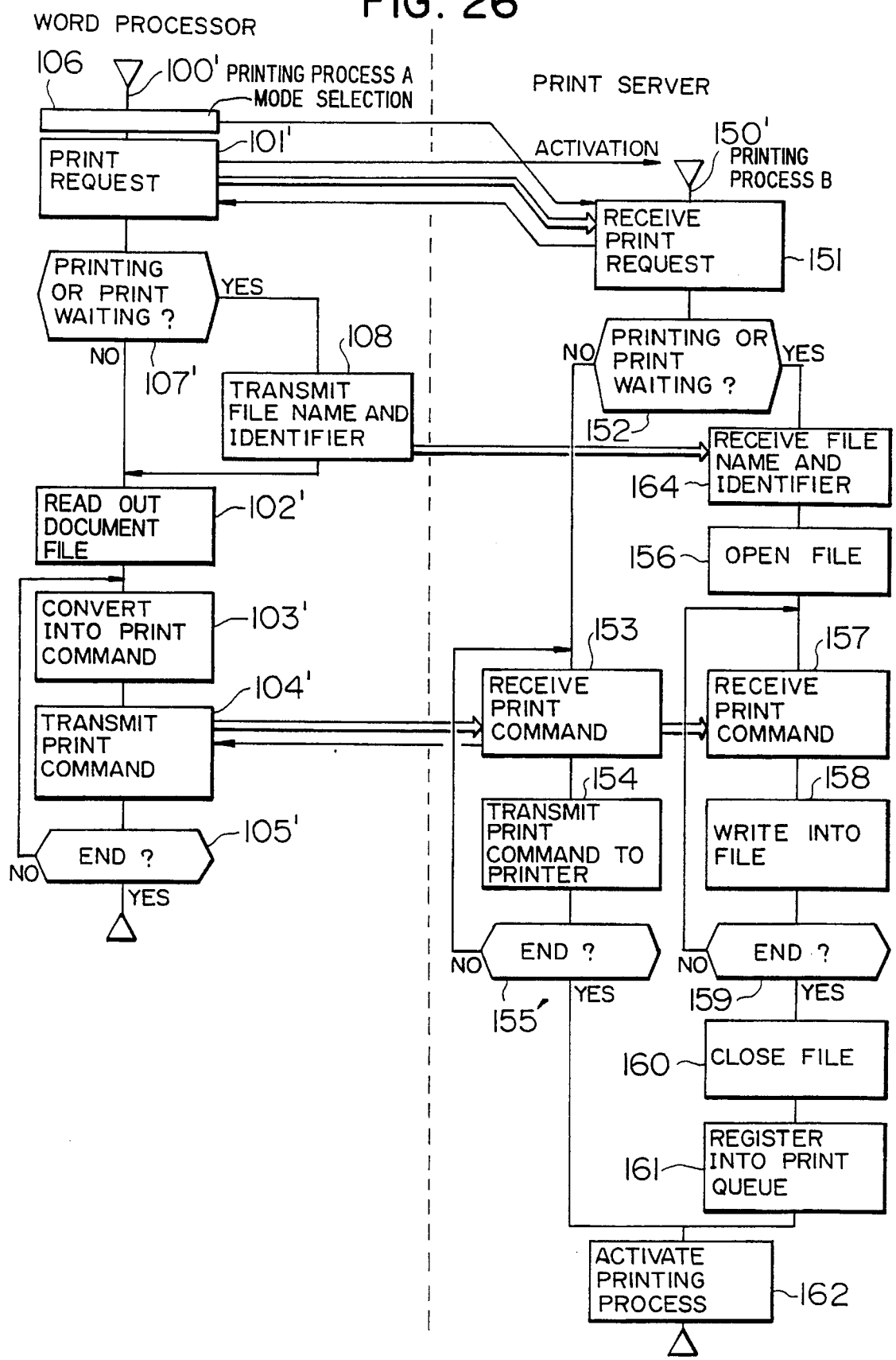
FIGS. 26 and 27 are flowcharts for explaining flows of the printing process in the embodiment shown in FIGS. 22 to 25.

The outline of the printing process in the system comprising the word processor 201 and the print server 202 with the construction described above will now be explained with reference to FIGS. 26 and 27. In FIG. 26, the printing process A 100' is a process of the word processor 201. A printing process B 150' and a printing process C 9000 are processes of the print server 202.

When the printing process A 100' to print the document file 5000 is activated in the word processor 201, in the case where the print command which is being outputted or whose output is waited doesn't exist in the print server 202, the printing process A 100' first selects a method to instruct whether a direct control function for immediately transmitting the print command received by the print server 202 to the printer and for waiting the output is executed or not (106) (which will be explained in detail hereinlater). The printing process B 150' of the print server 202 is subsequently activated. A print request to notify the execution of the printing in the print server 202 to the print server 202 is transmitted. A check is made to see if the print can be performed or not and a check is also made to see if the print server 202 is in the printing mode or the print waiting mode or not (101'). When the print server 202 is in the printing mode or the print waiting mode (107'), the document file name 5100 of the document file 5000 to be printed, client address 7120 to identify the word processor 201, and user identifier 7110 to identify the user of the word processor 201 who has instructed the printing are transmitted to the print server 202 (108). When the print server 202 is in a mode other than the printing mode and the print waiting mode, the document file 5000 to be printed is read out (102') and is converted into the print command 7300 (103'–105'). Upon conversion into the print command 7300, each time one print command 7300 is produced (103') as already described in FIG. 25, it is transmitted to the print server 202 by the print command transmitting process (104'). After completion of the conversion of the document file 5000 into the print command 7300, the printing process A 100' of the word processor 201 is finished (105'). On the other hand, in the print server 202, the printing process B 150' is activated by the process 101' of the word processor 201. The printing process B 150' receives the print request from the word processor 201. When the print server normally operates, it is notified to the word processor 201 (151) that the print server is in the printable state. At that time the print server 202 checks to see if the print command file 7000 is being printed or is waiting for printing (152). In the case of the printing mode or the print waiting mode, the document file name 5100 (print command file name 7100), client address 7120, and user identifier 7110 are received (164) and subsequently, the print command file 7000 is newly produced and opened (156). The print commands 7300 transmitted from the word processor 201 are received (157) and are sequentially written into the print command file 7000 (158). All of the print commands 7300 corresponding to one document file 5000 whose printing has been requested by the word processor 201 are received and written into the print command file 7000 (159). After that, the print command file 7000 is closed (160) and registered into the print queue 600 (161). When there is a print command file registered in the print queue 600 and the printing process C 9000, which will be explained hereinlater, is not activated, the printing process C is activated (162) and the printing process B is finished. On the other hand, in the processing step 152, when the print server is in the mode other than the printing mode and the print waiting mode, each time one print command 7300 is received (153), the print command 7300 is immediately directly transmitted to the printer 27 (154). All of the print commands 7300 corresponding to one document file 5000 whose printing has been requested from the word processor 201 are received. After that, when there is the print command file registered in the print queue 600 and the printing process C is not activated, the printing process C is activated (162) and the printing process B (150') is finished.

Upon transmission (104') of the print commands 7300 by the word processor 201, the result of the execution of the print command 7300, namely, the result regarding whether the execution of the process has correctly been finished or not is returned to the word processor 201. In the case where the print command 7300 is immediately sent from the word processor 201 to the printer 27 via the print server 202 (153, 154), the word processor 201 confirms the fact that the process corresponding to the print command 7300 has correctly been performed and finished by the printer 27 every print command 7300 by the execution result of the print command 7300. On the other hand, in the case where the print command 7300 transmitted from the word processor 201 is once stored into the print command file 7000 of the print server 202 (157, 158), the print server 202 determines that the process corresponding to the print command 7300 has correctly been finished. Thus, the print server returns the execution result indicative of the normal end of the process to the word processor 201. In the above case, the print server 202 confirms only the fact that the print command 7300 has correctly been stored into the print command file 7000.

In the printing process C 9000 activated by the process 162', the file name 623 of the queue block 620 connected to the head of the print queue 6000 is obtained (9010) and the print command file 7000 having the same file name 7100 as the file name 623 is opened (9020). The print command 7300 in the print command file 7000 is read out (9030) and is transmitted to the printer 27 (9040). When the transmission of all of the print commands stored in the print command file 7000 is finished (9050), the print command file 7000 is closed (9060). The queue block 620 corresponding to the print command file 7000 is deleted from the print queue 600 (9070). The printing process of the print command file 7000, namely, the transmitting process to the printer 27 (9010–9070) is executed until the queue block 620 of the print queue 600 doesn't exist (9080) and, thereafter, the printing process C 9000 is finished. The processes 100', 150', and 9000 of the print server 202 are controlled under the multitask operating system.

An error process which is executed in the embodiment will now be described with reference to FIGS. 28, 29, 30, and 31A to 31C.

For instance, at the start of the printing of each page, when the paper size of the page whose printing was finished just before the start of the printing is different from the paper size of the page to be printed next, a paper cassette in the printer 27 is switched by the page printing condition setting print command 7300. When the corresponding paper cassette doesn't exist upon switching of the paper cassette, or in the case where no paper is set in the corresponding paper cassette, or the like, it is necessary to execute an error process. The same shall also apply to the cases of all of the print commands 7300 without limiting to an error of the paper cassette.

Figure 28:
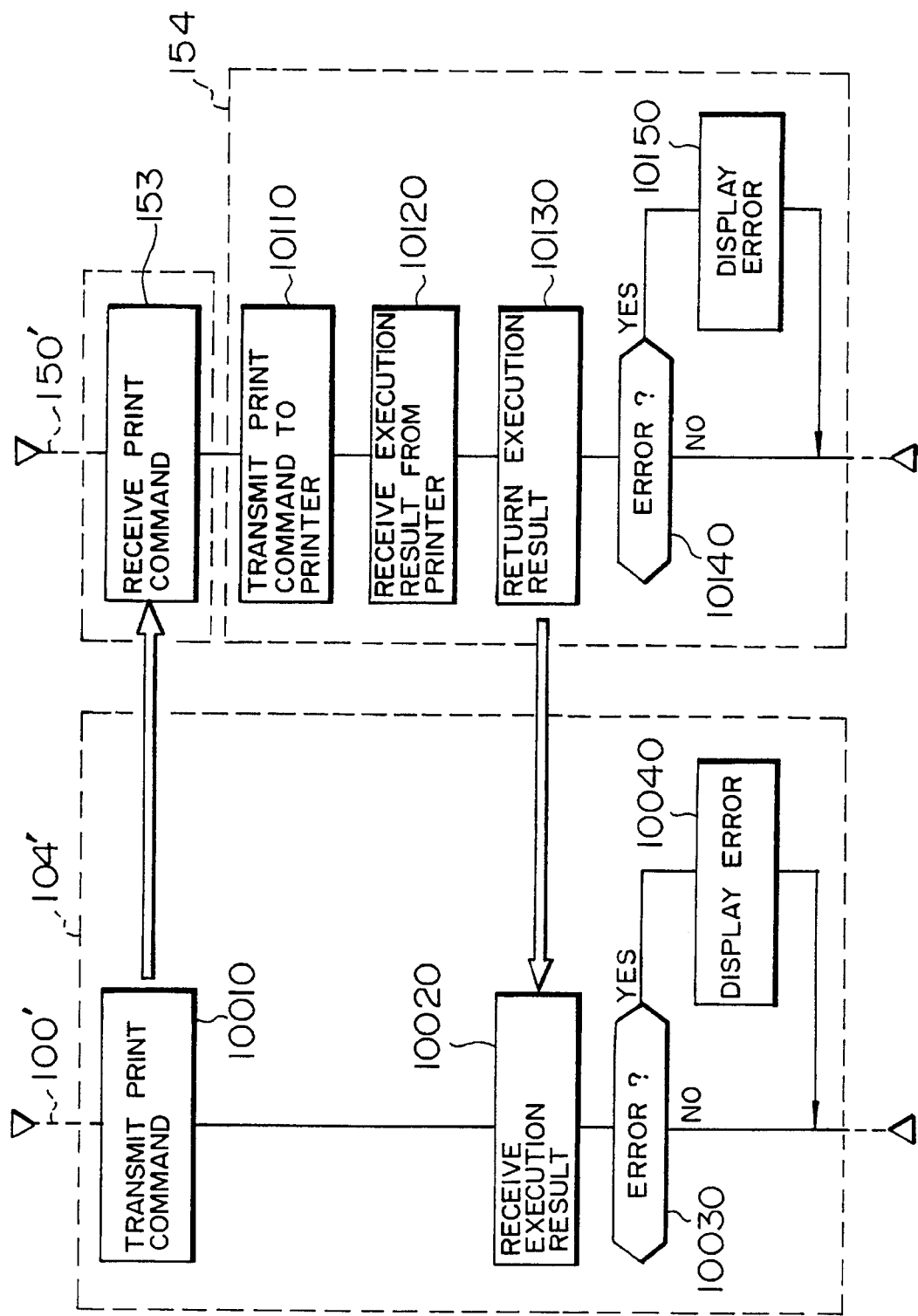
FIG. 28 is a flowchart showing an error process regarding the reception of a print command when the system is set into none of the printing mode and the print waiting mode in the embodiment.

The case where the print command 7300 is soon sent from the word processor 201 to the printer 27 via the print server 202 (104', 153, 154) will now be first described with reference to FIG. 28. In the word processor 201, when the print command 7300 is transmitted (10010), and when the print server 202 receives the print command 7300 (153), the print server 202 immediately transmits the print command 7300 to the printer 27 (10110). When the execution result of the print command 7300 is received from the printer 27 (10120), the execution result is transmitted to the word processor 201 (10130). The word processor 201 receives the execution result (10020). When the execution result indicates that the print command 7300 transmitted in the process 10010 was not correctly processed by the printer 27 (10030), the content of the error is displayed onto the display device 15. In the print server 202 as well, the error content is similarly displayed on the display device 25 (10140, 10150).

Figure 29:
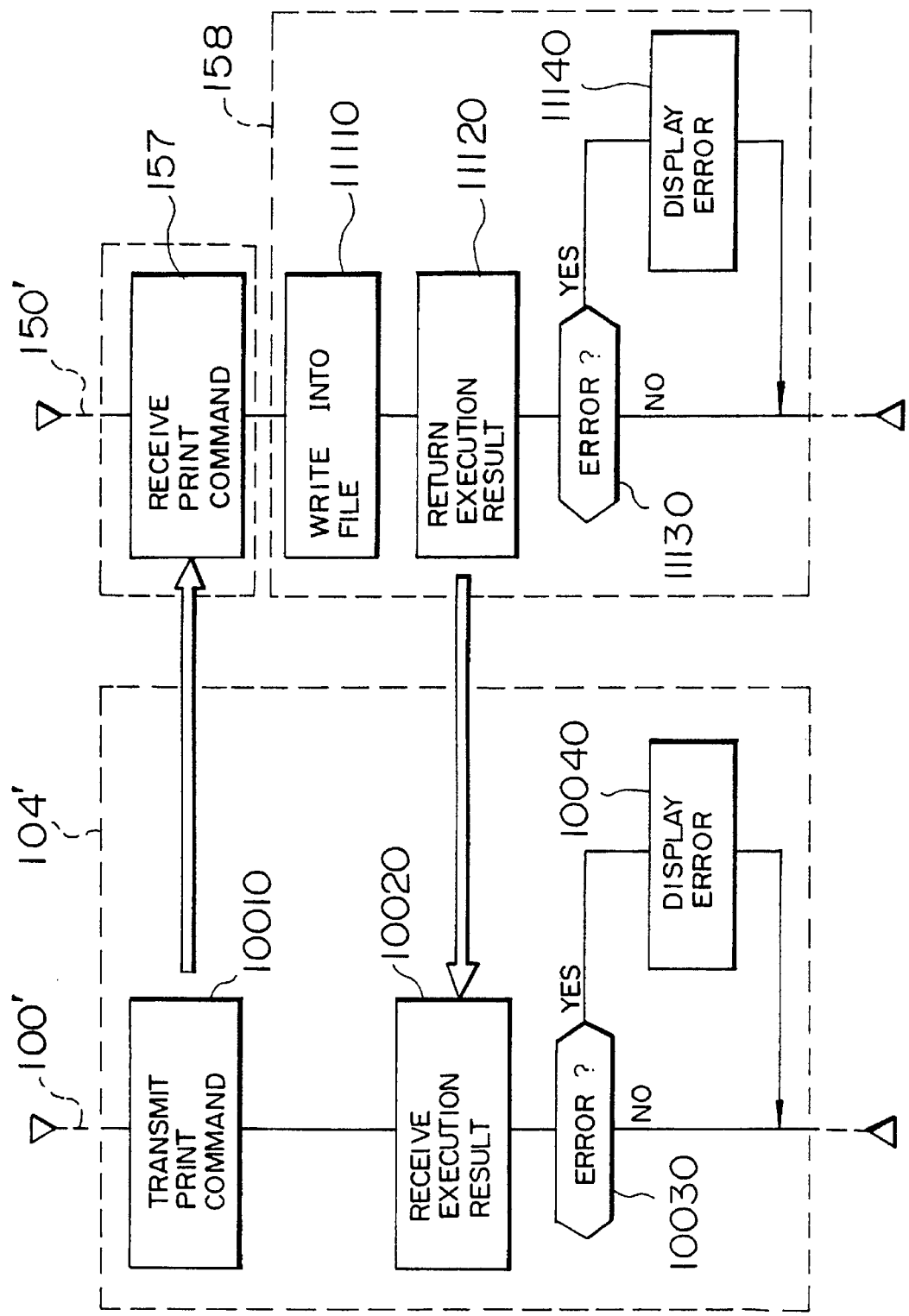
FIG. 29 is a flowchart showing an error process regarding the reception of the print command when the system is set in either the printing mode or the print waiting mode in the embodiment.
Figure 30:
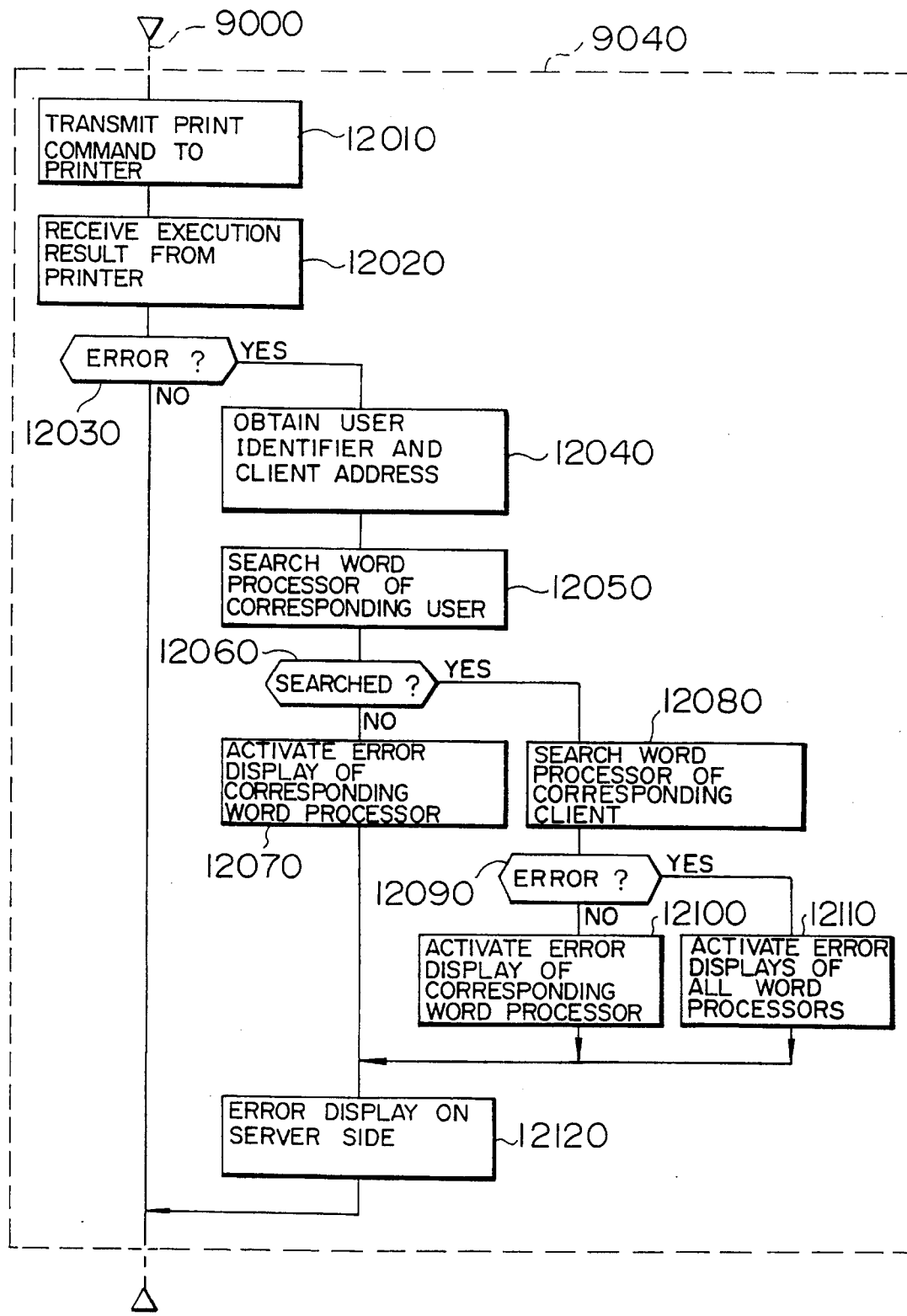
FIG. 30 is a flowchart showing an error process when the system is in the printing mode in the embodiment.

The case where the print command 7300 transmitted from the word processor 201 is once stored into the print command file 7000 will now be described with reference to FIGS. 29 and 30. The processes when the print commands 7300 are written into the print command file 7000 (104', 157, 158) will be first described with reference to FIG. 29. In the word processor 201, when the print command 7300 is transmitted (10010), and when the print server 202 receives the print command 7300 (157), the print server 202 immediately writes the print command 7300 into the print command file 7000 (11110). When the print command is correctly written, the execution result indicating that the process corresponding to the print command 7300 has correctly been executed is transmitted to the word processor 201 (11120). When the print command 7300 is not correctly written due to a cause of an abnormality of the LAN 203 or Hard disk drive device 26, the error content is displayed on the display device 15 of the word processor 201 and on the display device 25 of the print server 202 (10030, 10040, 11130, 11140) in a manner similar to the case mentioned above.

The process to print the print command file 7000 will now be described with reference to FIG. 30. In the process (9040) to transmit the print command 7300 to the printer 27, the print command 7300 is first transmitted to the printer 27 (12010) and the execution result of the print command 7300 is received from the printer 27 (12020). When the execution result indicates that the transmitted print command 7300 was not correctly processed by the printer 27 (12030), the following processes are executed. The user identifier 7110 and client address 7120 of the print command file 7000 are first read out (12040). The word processor 201 which is used by the user corresponding to the user identifier 7110 is searched (12050). The error content is displayed on the display device 15 of the word processor 201 and on the display device 25 of the print server 202 (12070, 12120). When the word processor 201 which is used by the corresponding user cannot be detected (12060), the word processor 201 corresponding to the client address (apparatus identifier) 7120 is searched (12080). The error content is displayed on the display device 15 of the word processor 201 and on the display device 25 of the print server 202 (12100, 12120). When the corresponding word processor 201 cannot be detected in both of the above cases (12090), the error content is displayed on the display devices 15 of all of the word processors 201 connected to the print server and on the display device 25 of the print server 202 (12110, 12120). However, the content of error message which is displayed on the word processor 201 side is changed with respect to each case as shown in FIGS. 31A, 31B, and 31C. In the case shown in FIG. 31A, a message including a document name 13110 and a user ID 13120 is displayed. In the case shown in FIG. 31B, a message including a document name 13210 and a user ID 13220 of the user who has requested the printing is displayed. In the case shown in FIG. 31C, a message including a document name 13310, a user ID 13320 of the user who has requested the printing, and a client address 13330 of the word processor which has requested the printing is displayed.

In the above embodiment, when the word processor 201 tries to print the file 5000 by the print server 202, the document file 5000 document is converted into the print command 7300 which can directly control the printer 27 and the print command 7300 is transmitted to the print server 202. When the print command file 7000 which is being printed or whose printing is waited doesn't exist, the print serve 202 directly transmits the print command 7300 to the printer 27 and prints. When the print command file 7000 which is being printed or whose printing is waited exists, the print command 7300 is stored into the print command file 7000 and is connected to the print queue 600. After that, the print commands 7300 stored in the print command file 7000 are sequentially printed. Thus, the waiting time until the start of the printing in the case where the print command file 7000 which is being printed or whose printing is waited doesn't exist can be reduced.

In the above embodiment, when the print server 202 is in the mode other than the printing mode and the print waiting mode, the print command 7300 is directly transmitted to the printer 27 and the printing is performed, thereby reducing the waiting time until the start of the printing. However, when the word processor 201 cannot execute a plurality of processes in parallel, there is considered a case where the user wants to finish the printing process A 100' as quickly as possible and to perform the editing work or the like. To finish the printing process A 100' of the word processor 201 as fast as possible, a method whereby the print commands 7300 are always stored into the print command file 7000 is suitable. This is because, as will be explained hereinlater, since the word processor 201 waits for the transmission of the next print command 7300 until the process corresponding to the print command 7300 is correctly finished, by immediately storing all of the print commands 7300 which are transmitted from the word processor 201 into the print command file 7000, the transmitting processes (103'–105') of the print commands can be finished early. For instance, upon transmission of the page printing condition setting print command, the word processor 201 waits for the change to the new page, namely, until the printed paper is discharged from the printer 27 and the paper to be printed next is completely fed. After that, the word processor 201 transmits the next print command. Therefore, by once storing the print commands 7300 into the print command file 7000, the waiting time can be reduced. The following embodiment is also considered and will now be explained with reference to FIG. 26.

The word processor 201 which cannot execute a plurality of processes in parallel transmits an instruction to always store the print commands 7300 into the print command file 7000 to the print server 202 when the printing is requested (101'). When the word processor 202 receives the above instruction (151'), the processes 156 to 161 are always performed and the print commands 7300 received from the word processor 201 are once stored into the print command file 7000.

Further, the following embodiment is also considered. When the print server 202 is in the mode other than the printing mode and the print waiting mode, either one of the mode to once store the print commands 7300 into the print command file 7000 and the mode to directly transmit the print commands 7300 to the printer 27 is selected by using the display device 15 of the word processor 201 and the keyboard 13 or mouse 14. The word processor 201 transmits the instruction to the print server 202 when the printing is requested (101'). The print server 202 executes the processes 153 to 155 or 156 to 161 in accordance with the above instruction.

In the printing process A 100', when the print server 202 is in the mode other than the printing mode and the print waiting mode, the method selecting process 106 is provided to make it possible to automatically or manually select either one of the mode to once store the print commands 7300 into the print command file 7000 and the mode to directly transmit the print commands 7300 to the printer 27. An identifier which can unequivocally identify the selected method is transmitted from the print requesting process 101' to a print request receiving process 151 on the print server side. In the discriminating process 152, either the processes 153 to 155 or the processes 156 to 161 are executed in accordance with the identifier. By using the above method, the processing efficiency and use easiness of the system comprising the word processor 201 and the print server 202 can be improved. Further, the above function is effective only when the print requesting receiving process 151 receives the identifier. In the cases other than the above case, the discrimination regarding whether either the processes 153 to 155 or the processes 156 to 161 are executed is automatically performed in a manner similar to the case of the foregoing embodiment.

In the above embodiment, the print commands 7300 corresponding to one document 4000 have been stored into one print command file 7000. However, there is also considered a method whereby the print commands 7300 corresponding to one document 4000 are separately divided every page 4100 and stored into the print command file 7000. In such a case, even when the print commands 7300 are once stored into the print command file 7000, the user can reduce the waiting time until the first printed page is obtained. This is because although the first page is hitherto printed after the print command file 7000 of one document 4000 was produced, according to the later method, the first page is printed after the print command file 7000 of one page was produced, so that the waiting time which is required until the start of the printing can be reduced. In the case where the document 4000 is constructed by a plurality of chapters, there is also considered a method whereby the print command file 7000 is produced on a chapter unit basis.

In the above embodiment, the print command which can directly control the printer is always transmitted from the word processor 201 to the print server. However, when the print server 202 is in the printing mode or the print waiting mode, the word processor 201 can also directly transmit the document file 5000 to the print server 202. Embodiments using such a method will now be described with reference to FIGS. 32 and 33.

Figure 27:
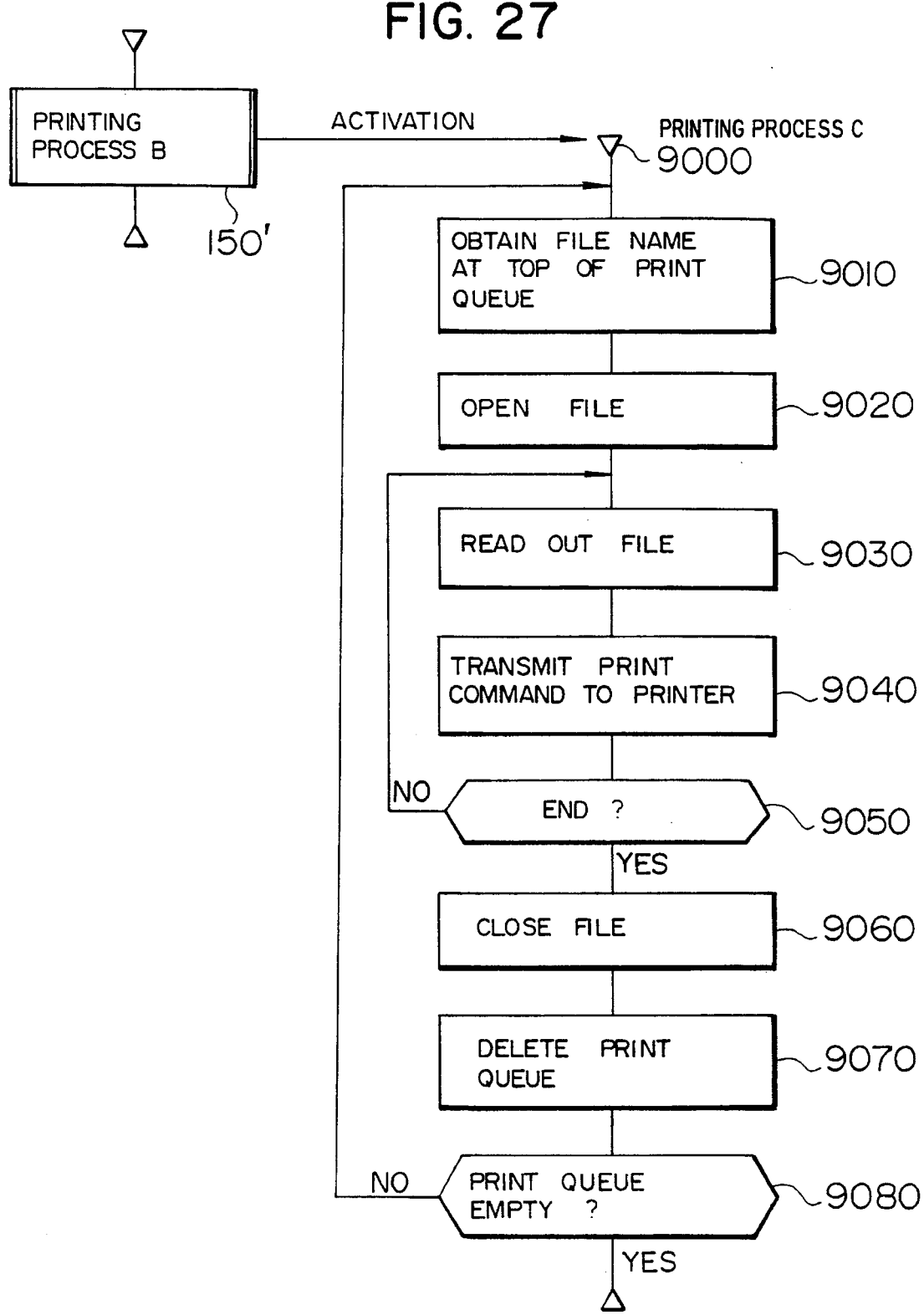
Figure 32:
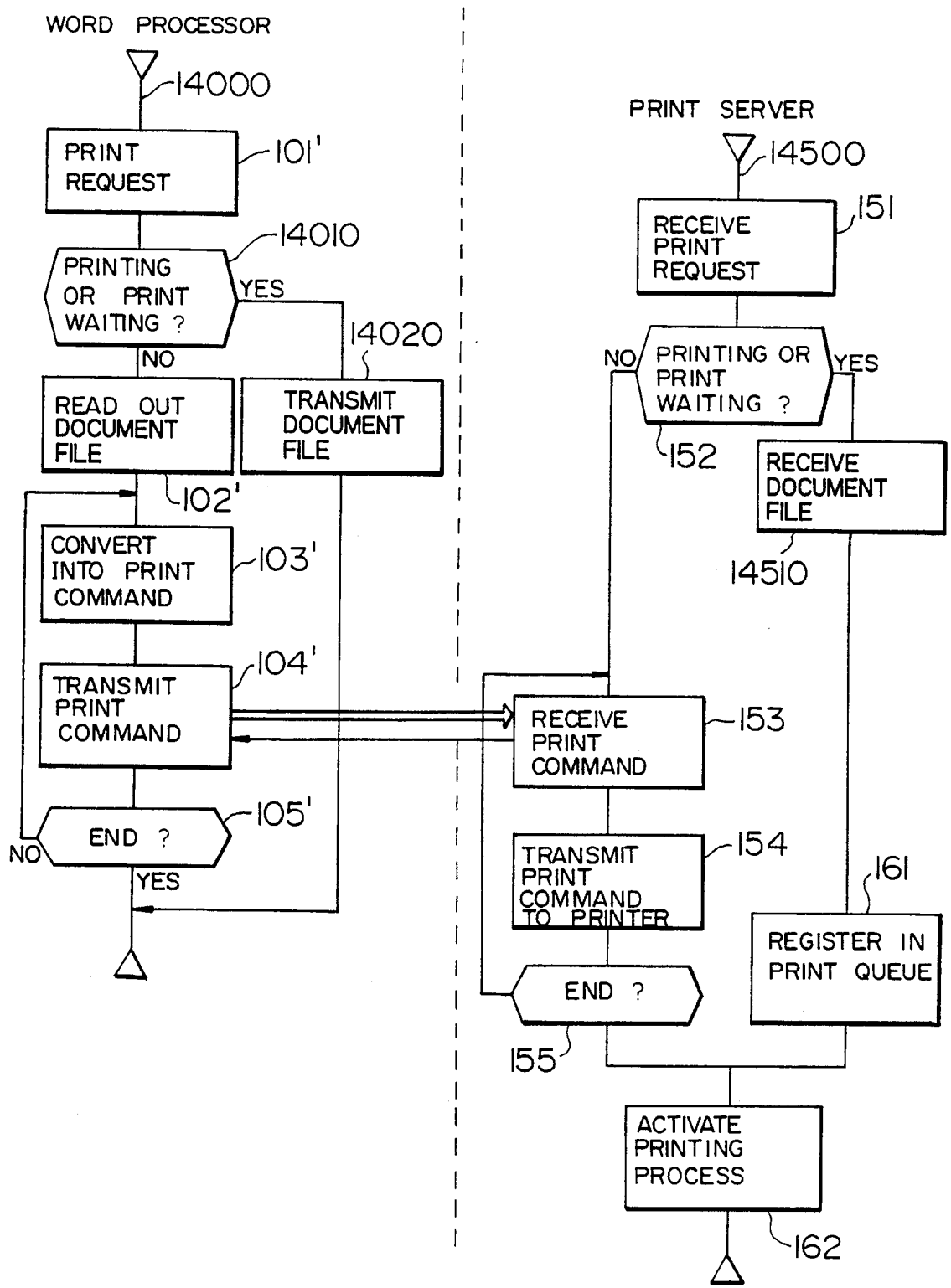
FIGS. 32 and 33 are flowcharts showing the flows of a printing process in other embodiments according to the invention.
Figure 33:
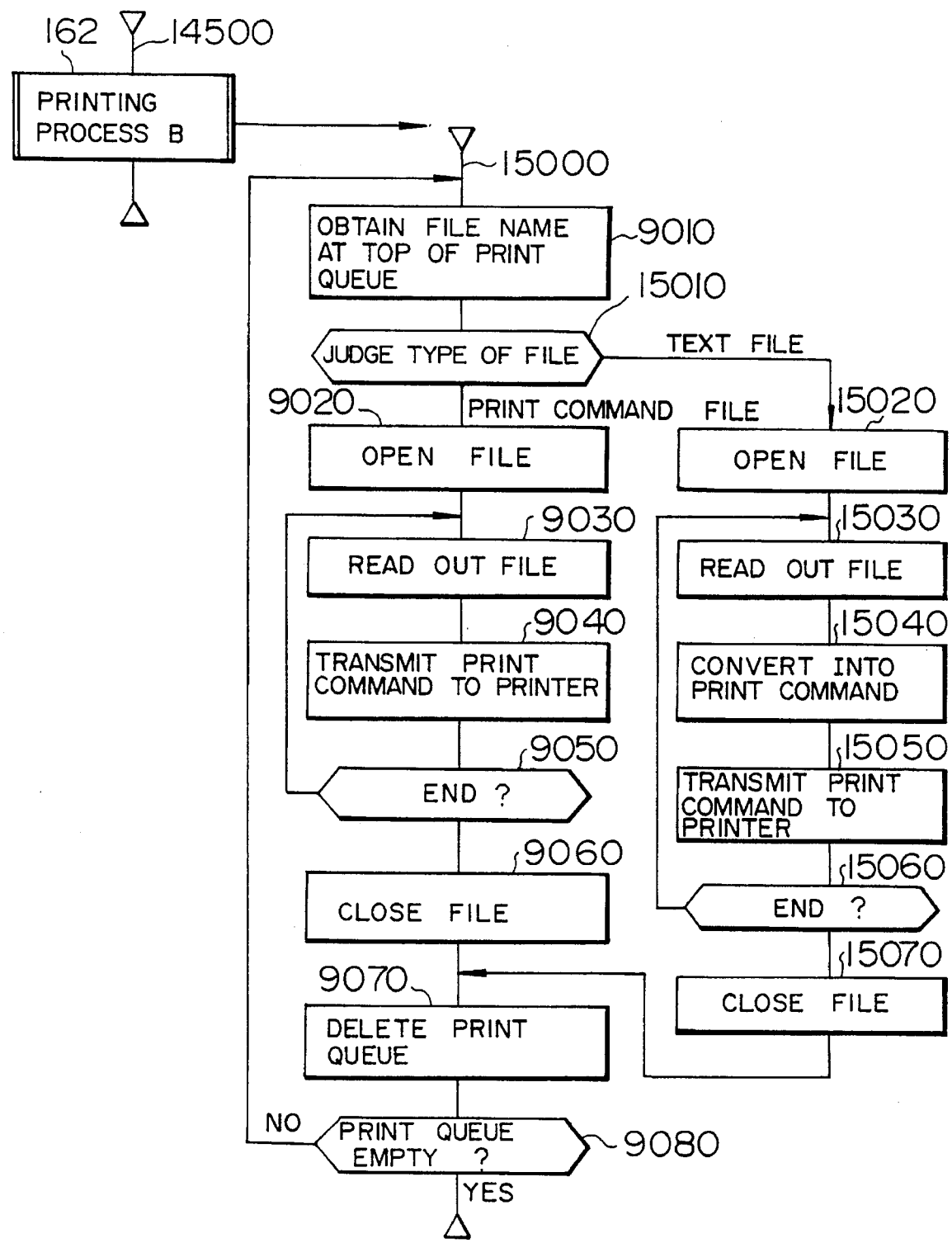

Processes 14000 and 14500 in FIG. 32 and a process 15000 in FIG. 33 are respectively provided in place of the processes 100' and 150' in FIG. 26 and the process 9000 in FIG. 27 which have been described in the first embodiment. That is, in the case where the print server 202 is in the printing mode or the print waiting mode (14010) when the print request is instructed from the word processor 201 to the print server 202 (101'), the word processor 201 transmits the document data 5200 to the print server 202 (14020). The print server 202 receives the document file 5000 in which the document data 5200 is stored (14510). The document file 5000 is registered into the print queue 600 of the print server 202 (161). On the other hand, when the print server is in the mode other than the printing mode and the print waiting mode, the word processor 201 reads out the document data 5200 (102') and, thereafter, converts into the print command 7300 (103') and transmits the print command 7300 to the print server 202 (104'). The print server 202 receives the print command 7300 (153) and, thereafter, immediately transmits to the printer 27 (154). The printing process 15000 in which the process 14500 of the print server 202 was activated (162) obtains a file name 623a corresponding to a top of print queue 620a (9010). When the file name 623a indicates the print command file 7000 (15010), the print command file 7000 is read out (9020, 9030). The print command 7300 is directly transmitted to the printer 27 (9040). On the other hand, when the file name 623a indicates the document file 5000, the document file 5000 is read out (15030) and is converted into the print command 7300 (15040). After that, the print command is transmitted to the printer 27 (15050). In the embodiment, when the print server 202 is in the printing mode or the print waiting mode, the word processor 201 directly transmits the document file 5000 to the print server 202. In the word processor 201, consequently, the transmitting time can be reduced due to a decrease in data amount which is transmitted and the processing burden of the word processor 201 regarding the conversion of the document data 5200 to the print commands 7300 can be reduced.

According to the above embodiment, in the print server, when there is no data which is being outputted or whose output is waited, the data is directly transmitted to the output apparatus and is immediately outputted. When there is the data which is being outputted or whose output is waited, the data is stored into the memory device and is sequentially generated. Thus, the waiting time which is required until the start of the output in the case where there is no output data which is being outputted or whose output is waited can be reduced. The output commands which are produced by the clients can be made coincide in both of the system for outputting the data to the output apparatus through the server and the system for outputting the data to the output apparatuses which are directly connected to the clients. An increase in the amount of processing programs of the clients who produce output commands can be suppressed.

We claim:

1. A print program control method whereby a print server prints print data from a printing request initiated from at least one information processing apparatus on a basis of a print control program, said print server having a printer, a controller for controlling a print output of the printer, and a storing means controlled by the controller for storing therein a print control program to cause said printer to effect a printing operation, said print server and said information processing apparatus being interconnected via a LAN, said method comprising the steps of:

checking, by said at least one information processing apparatus upon initiating a printing request, to see whether or not a predetermined print control program suitable to print a pending print data in a layout desired by said information processing apparatus is currently stored in said storing means for storing a plurality of print control programs in said print server;

transferring said predetermined print control program from said information processing apparatus to said storing means in said print server via the LAN when such a print control program is not stored; and printing said pending print data by said predetermined print control program stored in said storing means.

2. A method according to claim 1, wherein said step of transferring said predetermined print control program to said storing means includes the steps of:

determining a deletion print control program of a plurality of print control programs stored already in said storing means which should be deleted when space area isn't enough for storing said predetermined print control program in said storing means;

deleting said deletion print control program from the storing means in order to obtain a space area; and storing said predetermined print control program into said space area.

3. A method according to claim 2, wherein the step of determining said deletion print control program to be deleted includes the steps of:

storing a number of times which each print control program of said plurality of print control programs stored in said storing means have been used to print; and determining at least one print control program in which a number of times used to print is smallest from among said plurality of print control programs and designating said at least one print control program as said deletion print program.

4. A method according to claim 1, wherein, in the step of checking to see whether or not said predetermined print control program has been stored in said storing means, when it is known that an old software version of said predetermined print control program has been stored, then before said pending print data is printed, replacing said predetermined print control program of the old software version by said predetermined print control program of a newer software version.

5. A method according to claim 1, wherein the step of checking to see whether or not said predetermined print control program is currently stored in said storing means is also executed just after a power source of said information processing apparatus is turned on, or just after said information processing apparatus is connected to said printer server through a communicating medium.

6. A method according to claim 1, wherein said predetermined print control program is transferred by said information processing apparatus into a space area of said storing means just before or just after said information processing apparatus transmits or transmitted said pending print data to said print server.

7. A method according to claim 1, wherein a list of print control programs stored in said storing means is displayed on a display means of at least one of said information processing apparatus and said print server.

8. A method according to claim 1, wherein print control programs stored in said storing means are deleted in at least one of said information processing apparatus and said print server in accordance with an instruction which is input through input means.

9. A printing system comprising:

at least one information processing apparatus for initiating a print request and for providing print data related to said print request; and a print server having printer, a controller for controlling a print output of the printer, and a storing means controlled by the controller for storing therein a print control program to cause said printer to effect a printing operation, said print server and said information processing apparatus being interconnected via a LAN, said print server for printing said print data on a basis of a predetermined print control program suitable to print said print data in a layout desired by said information processing apparatus, and wherein said information processing apparatus includes a checking means for checking, upon initiating a printing request, to see whether or not said predetermined print control program suitable to print said print data is currently stored in said storing means and a transferring means for transferring and storing said predetermined print control program into said storing means in said print server via said LAN when said predetermined print control program is not stored in said storing means.

10. A system according to claim 9, further including a deciding means for deciding a deletion print control program of a plurality of print control programs stored already in said storing means which should be deleted if an available space area to store said predetermined print control program isn't enough in said storing means.

11. A system according to claim 10, wherein said deciding means includes a use deciding means for storing a number of times which each print control program of said plurality of print control programs were used to print and for selecting one or more print control programs in which a number of times used to print is smallest from among said plurality of print control programs and for designating said one or more print control programs as said deletion print control program to be deleted.

12. A system according to claim 9, wherein at least one of said information processing apparatus and said print server includes a display means for displaying a list of print control programs stored in said storing means.

13. A print program control method whereby a print server prints print data from a printing request initiated from at least one information processing apparatus on a basis of a print control program, said print server having printer, a controller for controlling print output of the printer, and a storing means controlled by the controller for storing therein a print control program to cause said printer to effect a printing operation, said print server and said information processing apparatus being interconnected via a LAN, said method, said method comprising the steps of:

checking, by said at least one information processing apparatus upon initiating a printing request, to see whether or not a predetermined print control program suitable to print a pending print data in a layout desired by said information processing apparatus is currently stored in said storing means for storing a plurality of print control programs in said print server;

transferring said predetermined print control program from said information processing apparatus to said storing means in said print server via the LAN only when such a print control program is not currently stored, in that said predetermined print control program is not transferred when such a print control program is currently stored; and printing said pending print data by said predetermined print control program stored in said storing means.

14. A printing system comprising:

at least one information processing apparatus for initiating a print request and for providing print data related to said print request; and a print server having a printer, a controller for controlling a print output of the printer, and a storing means controlled by the controller for storing there a print control program to cause said printer to effect a printing operation, said print server and said information processing apparatus being interconnected via a LAN, said method for printing said print data on a basis of a predetermined print control program suitable to print said print data in a layout desired by said information processing apparatus, and wherein said information processing apparatus includes a checking means for checking, upon initiating a printing request, to see whether or not said predetermined print control program suitable to print said print data is currently stored in said storing means and a transferring means for transferring and storing said predetermined print control program into said storing means in said print server via said LAN only when said predetermined print control program is not currently stored in said storing means, in that said predetermined print control program is not transferred when such a print control program is currently stored.

* * * * *